United States Patent
Kuo

(10) Patent No.: US 12,363,587 B2
(45) Date of Patent: Jul. 15, 2025

(54) METHOD AND APPARATUS FOR DUPLICATE PDU DISCARDING FOR MULTI-PATH TRANSMISSION IN A WIRELESS COMMUNICATION SYSTEM

(71) Applicant: ASUS Technology Licensing Inc., Taipei (TW)

(72) Inventor: Richard Lee-Chee Kuo, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 104 days.

(21) Appl. No.: 18/222,185

(22) Filed: Jul. 14, 2023

(65) Prior Publication Data

US 2024/0049050 A1  Feb. 8, 2024

Related U.S. Application Data

(60) Provisional application No. 63/396,726, filed on Aug. 10, 2022, provisional application No. 63/394,494, filed on Aug. 2, 2022.

(51) Int. Cl.
*H04W 28/06* (2009.01)
*H04W 76/14* (2018.01)

(52) U.S. Cl.
CPC .......... *H04W 28/06* (2013.01); *H04W 76/14* (2018.02)

(58) Field of Classification Search
None
See application file for complete search history.

(56) References Cited

U.S. PATENT DOCUMENTS

| 10,659,381 B2 | 5/2020 | Jose et al. |
| 2019/0098640 A1* | 3/2019 | Holakouei .......... H04W 72/542 |
| 2021/0029777 A1* | 1/2021 | Lv .......... H04W 80/02 |

FOREIGN PATENT DOCUMENTS

WO  WO-2023280978 A2 *  1/2023

* cited by examiner

*Primary Examiner* — Gary Mui
*Assistant Examiner* — Nancy Sixto
(74) *Attorney, Agent, or Firm* — Skaar Ulbrich Macari, P.A.

(57) ABSTRACT

A method and device for duplicate PDU discarding. In one embodiment, a User Equipment (UE) establishes a direct path and an indirect path to communicate with a network. The UE also establishes a radio bearer, wherein the radio bearer is mapped to a first Radio Link Control (RLC) entity and a second RLC entity and wherein the first RLC entity is used for communication with the network over the direct path and the second RLC entity is used for communication with the network over the indirect path. In addition, a Packet Data Convergence Protocol (PDCP) entity, which is in the UE and which is associated with the radio bearer, prevents from indicating to the first RLC entity to discard a first PDCP PDU when successful delivery of the first PDCP PDU is confirmed by the second RLC entity.

18 Claims, 21 Drawing Sheets

US 12,363,587 B2

METHOD AND APPARATUS FOR DUPLICATE PDU DISCARDING FOR MULTI-PATH TRANSMISSION IN A WIRELESS COMMUNICATION SYSTEM

CROSS-REFERENCE TO RELATED APPLICATIONS

The present Application claims the benefit of U.S. Provisional Patent Application Ser. No. 63/394,494 filed on Aug. 2, 2022 and U.S. Provisional Patent Application Ser. No. 63/396,726 filed on Aug. 10, 2022, the entire disclosures of which are incorporated herein in its entirety by reference.

FIELD

This disclosure generally relates to wireless communication networks, and more particularly, to a method and apparatus for duplicate Protocol Data Unit (PDU) discarding for multi-path transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device for duplicate PDU discarding. In one embodiment, a User Equipment (UE) establishes a direct path and an indirect path to communicate with a network. The UE also establishes a radio bearer, wherein the radio bearer is mapped to a first Radio Link Control (RLC) entity and a second RLC entity and wherein the first RLC entity is used for communication with the network over the direct path and the second RLC entity is used for communication with the network over the indirect path. In addition, a Packet Data Convergence Protocol (PDCP) entity, which is in the UE and which is associated with the radio bearer, prevents from indicating to the first RLC entity to discard a first PDCP PDU when successful delivery of the first PDCP PDU is confirmed by the second RLC entity.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: TS 38.300 V17.0.0, "NR; NR and NG-RAN Overall Description; Stage 2 (Release 17)"; TS 37.340 V17.0.0, "E-UTRA and NR; Multi-connectivity; Stage 2 (Release 17)"; TS 38.323 V17.0.0, "NR; Packet Data Convergence Protocol (PDCP) specification (Release 17)"; "TS 38.351 V17.1.0, NR; Sidelink Relay Adaptation Protocol (SRAP) Specification (Release 17)"; and TR 23.700-33 V0.2.0, "Study on system enhancement for Proximity based services (ProSe) in the 5G System (5GS); Stage 2 (Release 18)". The standards and documents listed above are hereby expressly incorporated by reference in their entirety.

Figure 1:
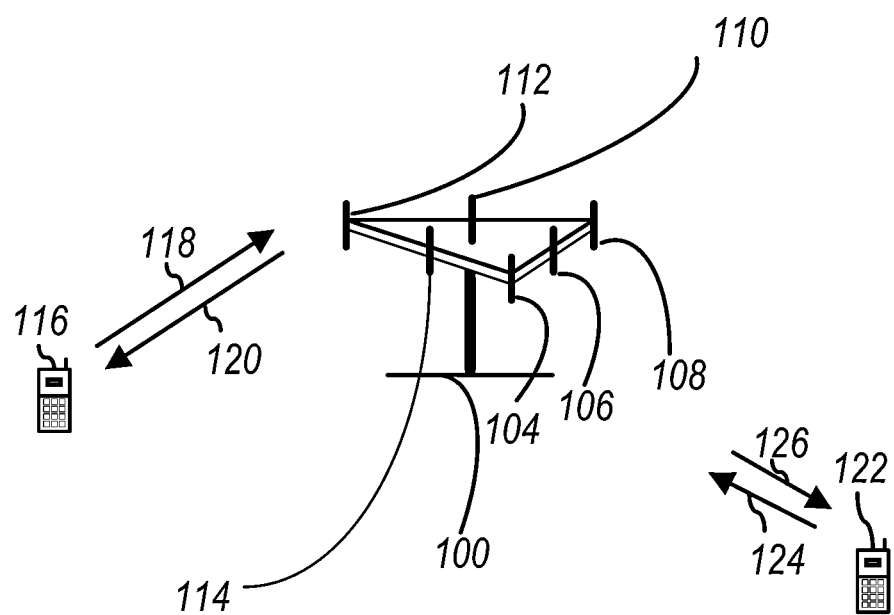
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
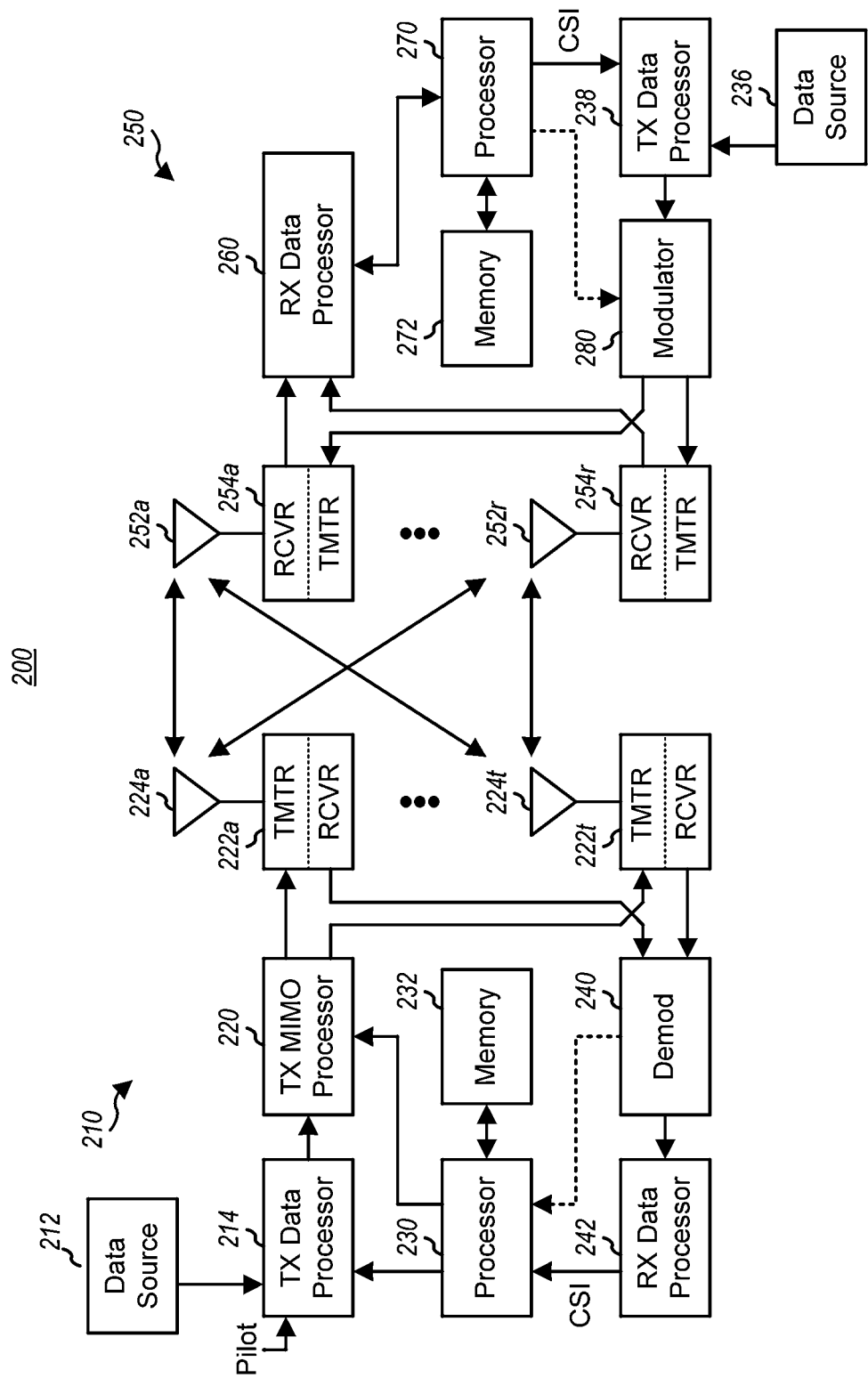
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
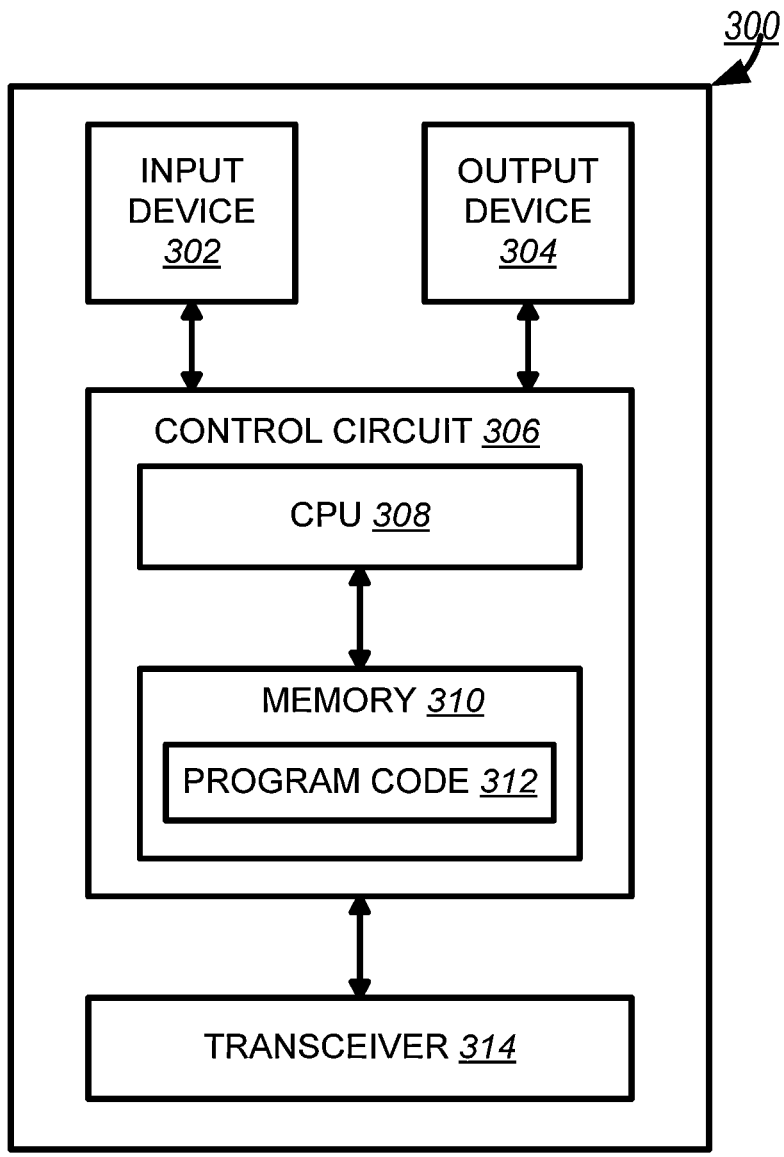
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
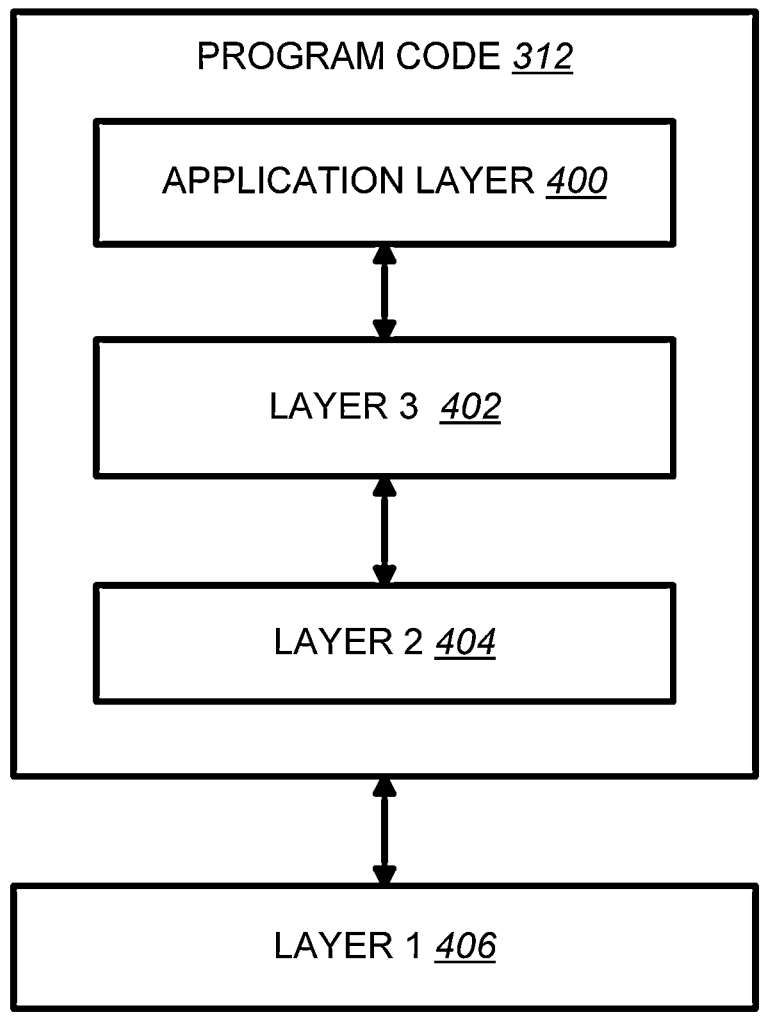
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 38.300 specifies user plane protocol stack, packet duplication, and sidelink Relay for NR as follows:
4.4 Radio Protocol Architecture
4.4.1 User Plane
The figure below shows the protocol stack for the user plane, where SDAP, PDCP, RLC and MAC sublayers (terminated in gNB on the network side) perform the functions listed in clause 6.

Figure 5:
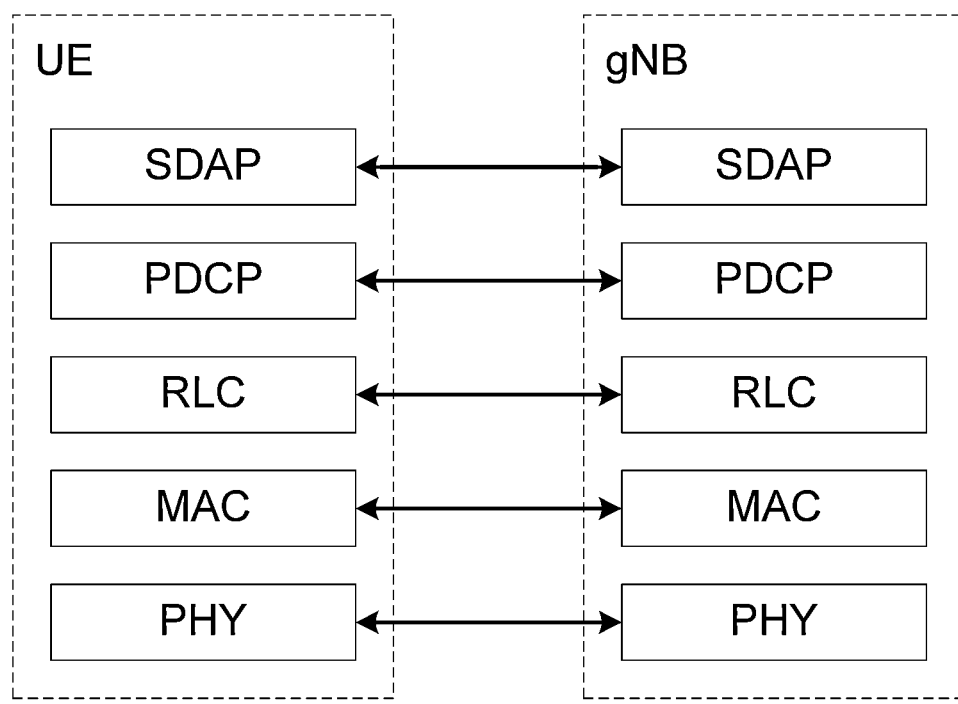
FIG. 5 is a reproduction of FIG. 4.4.1-1 of 3GPP TS 38.300 V17.0.0.

FIG. 4.4.1-1 of 3GPP TS 38.300 V17.0.0, Entitled "User Plane Protocol Stack", is Reproduced as FIG. 5

Figure 16:
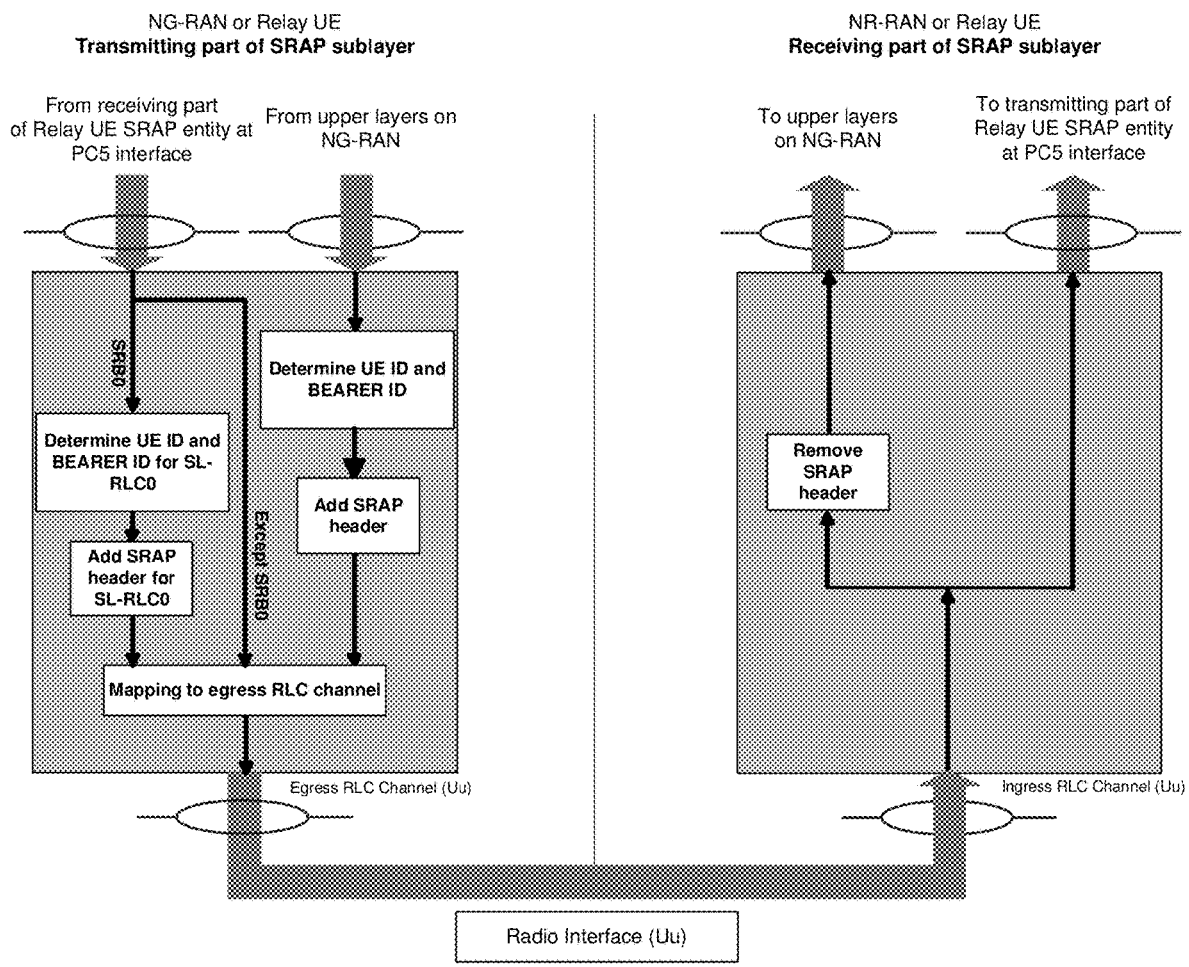
FIG. 16 is a reproduction of FIG. 4.2.2-3 of 3GPP TS 38.351 V17.0.0.

[ . . . ]
16.1 URLLC
[ . . . ]
16.1.3 Packet Duplication
When duplication is configured for a radio bearer by RRC, at least one secondary RLC entity is added to the radio bearer to handle the duplicated PDCP PDUs as depicted on FIG. 16.1.3-1, where the logical channel corresponding to the primary RLC entity is referred to as the primary logical channel, and the logical channel corresponding to the secondary RLC entity(ies), the secondary logical channel(s). All RLC entities have the same RLC mode. Duplication at PDCP therefore consists in submitting the same PDCP PDUs multiple times: once to each activated RLC entity for the radio bearer. With multiple independent transmission paths, packet duplication therefore increases reliability and reduces latency and is especially beneficial for URLLC services.

Figure 6:
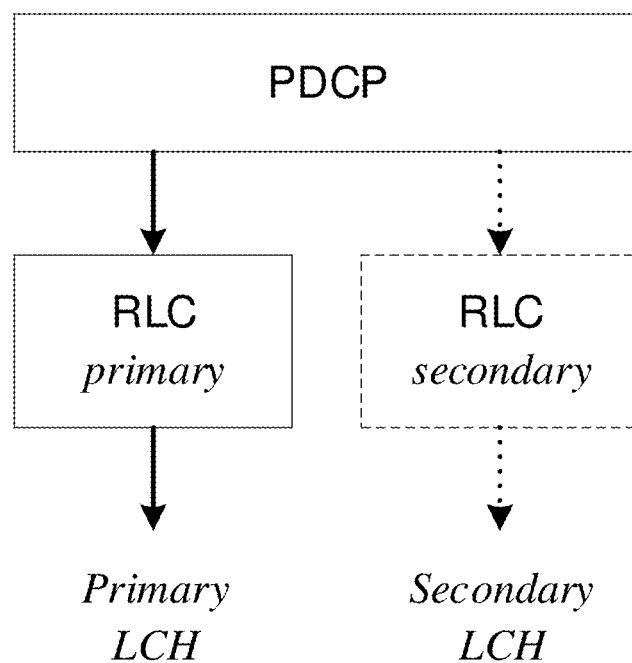
FIG. 6 is a reproduction of FIG. 16.1.3-1 of 3GPP TS 38.300 V17.0.0.

FIG. 16.1.3-1 of 3GPP TS 38.300 V17.0.0, Entitled "Packet Duplication", is Reproduced as FIG. 6

NOTE: PDCP control PDUs are not duplicated and always submitted to the primary RLC entity.
When configuring duplication for a DRB, RRC also sets the state of PDCP duplication (either activated or deactivated) at the time of (re-)configuration. After the configuration, the PDCP duplication state can then be dynamically controlled by means of a MAC control element and in DC, the UE applies the MAC CE commands regardless of their origin (MCG or SCG). When duplication is configured for an SRB the state is always active and cannot be dynamically controlled. When configuring duplication for a DRB with more than one secondary RLC entity, RRC also sets the state of each of them (i.e. either activated or deactivated). Subsequently, a MAC CE can be used to dynamically control whether each of the configured secondary RLC entities for a DRB should be activated or deactivated, i.e. which of the RLC entities shall be used for duplicate transmission. Primary RLC entity cannot be deactivated. When duplication is deactivated for a DRB, all secondary RLC entities associated to this DRB are deactivated. When a secondary RLC entity is deactivated, it is not re-established, the HARQ buffers are not flushed, and the transmitting PDCP entity should indicate to the secondary RLC entity to discard all duplicated PDCP PDUs.

When activating duplication for a DRB, NG-RAN should ensure that at least one serving cell is activated for each logical channel associated with an activated RLC entity of the DRB; and when the deactivation of SCells leaves no serving cells activated for a logical channel of the DRB, NG-RAN should ensure that duplication is also deactivated for the RLC entity associated with the logical channel.

When duplication is activated, the original PDCP PDU and the corresponding duplicate(s) shall not be transmitted on the same carrier. The logical channels of a radio bearer configured with duplication can either belong to the same MAC entity (referred to as CA duplication) or to different ones (referred to as DC duplication). CA duplication can also be configured in either or both of the MAC entities together with DC duplication when duplication over more than two RLC entities is configured for the radio bearer. In CA duplication, logical channel mapping restrictions are used in a MAC entity to ensure that the different logical channels of a radio bearer in the MAC entity are not sent on the same carrier. When CA duplication is configured for an SRB, one of the logical channels associated to the SRB is mapped to SpCell.

When CA duplication is deactivated for a DRB in a MAC entity (i.e. none or only one of RLC entities of the DRB in the MAC entity remains activated), the logical channel mapping restrictions of the logical channels of the DRB are lifted for as long as CA duplication remains deactivated for the DRB in the MAC entity.

When an RLC entity acknowledges the transmission of a PDCP PDU, the PDCP entity shall indicate to the other RLC entity(ies) to discard it. In addition, in case of CA duplication, when an RLC entity restricted to only SCell(s) reaches the maximum number of retransmissions for a PDCP PDU, the UE informs the gNB but does not trigger RLF.
[ . . . ]
16.12 Sidelink Relay
16.12.1 General
Sidelink relay is introduced to support 5G ProSe UE-to-Network Relay (U2N Relay) function (specified in TS 23.304 [48]) to provide connectivity to the network for U2N Remote UE(s). Both L2 and L3 U2N Relay architectures are supported. The L3 U2N Relay architecture is transparent to the serving RAN of the U2N Relay UE, except for controlling sidelink resources. The detailed architecture and procedures for L3 U2N Relay can be found in TS 23.304 [48]. A U2N Relay UE shall be in RRC_CONNECTED to perform relaying of unicast data.
For L2 U2N Relay operation, the following RRC state combinations are supported:
  Both U2N Relay UE and U2N Remote UE shall be in RRC CONNECTED to perform transmission/reception of relayed unicast data; and
  The U2N Relay UE can be in RRC_IDLE, RRC_INACTIVE or RRC_CONNECTED as long as all the U2N Remote UE(s) that are connected to the U2N Relay UE are either in RRC_INACTIVE or in RRC_IDLE.

For L2 U2N Relay, the U2N Remote UE can only be configured to use resource allocation mode 2 (as specified in 5.7.2 and 16.9.3.1) for data to be relayed.

A single unicast link is established between one L2 U2N Relay UE and one L2 U2N Remote UE.

The traffic of U2N Remote UE via a given U2N Relay UE and the traffic of the U2N Relay UE shall be separated in different Uu RLC channels over Uu.

3GPP TS 37.340 specifies Multi-Radio Dual Connectivity (MR-DC) as follows:

3.1 Definitions

[. . . ]

MCG bearer: in MR-DC, a radio bearer with an RLC bearer (or two RLC bearers, in case of CA packet duplication in an E-UTRAN cell group, or up to four RLC bearers in case of CA packet duplication in a NR cell group) only in the MCG.

MN terminated bearer: in MR-DC, a radio bearer for which PDCP is located in the MN.

[. . . ]

SCG bearer: in MR-DC, a radio bearer with an RLC bearer (or two RLC bearers, in case of CA packet duplication in an E-UTRAN cell group, or up to four RLC bearers in case of CA packet duplication in a NR cell group) only in the SCG.

SN terminated bearer: in MR-DC, a radio bearer for which PDCP is located in the SN.

[. . . ]

Split bearer: in MR-DC, a radio bearer with RLC bearers both in MCG and SCG.

[. . . ]

4 Multi-Radio Dual Connectivity 4.1 General 4.1.1 Common MR-DC principles

Multi-Radio Dual Connectivity (MR-DC) is a generalization of the Intra-E-UTRA Dual Connectivity (DC) described in TS 36.300 [2], where a multiple Rx/Tx capable UE may be configured to utilise resources provided by two different nodes connected via non-ideal backhaul, one providing NR access and the other one providing either E-UTRA or NR access. One node acts as the MN and the other as the SN. The MN and SN are connected via a network interface and at least the MN is connected to the core network.

The MN and/or the SN can be operated with shared spectrum channel access.

All functions specified for a UE may be used for an IAB-MT unless otherwise stated. Similar as specified for UE, the IAB-MT can access the network using either one network node or using two different nodes with EN-DC and NR-DC architectures. In EN-DC, the backhauling traffic over the E-UTRA radio interface is not supported.

NOTE 1: MR-DC is designed based on the assumption of non-ideal backhaul between the different nodes but can also be used in case of ideal backhaul.

NOTE 2: All MR-DC normative text and procedures in this version of the specification show the aggregated node case. The details about non-aggregated node for MR-DC operation are described in TS 38.401 [7].

[. . . ]

4.1.3.3 NR-NR Dual Connectivity

NG-RAN supports NR-NR Dual Connectivity (NR-DC), in which a UE is connected to one gNB that acts as a MN and another gNB that acts as a SN. In addition, NR-DC can also be used when a UE is connected to a single gNB, acting both as a MN and as a SN, and configuring both MCG and SCG.

[. . . ]

4.2 Radio Protocol Architecture 4.2.1 Control Plane

In MR-DC, the UE has a single RRC state, based on the MN RRC and a single C-plane connection towards the Core Network. FIG. 4.2.1-1 illustrates the Control plane architecture for MR-DC. Each radio node has its own RRC entity (E-UTRA version if the node is an eNB or NR version if the node is a gNB) which can generate RRC PDUs to be sent to the UE.

RRC PDUs generated by the SN can be transported via the MN to the UE. The MN always sends the initial SN RRC configuration via MCG SRB (SRB1), but subsequent reconfigurations may be transported via MN or SN. When transporting RRC PDU from the SN, the MN does not modify the UE configuration provided by the SN.

In E-UTRA connected to EPC, at initial connection establishment SRB1 uses E-UTRA PDCP. If the UE supports EN-DC, regardless whether EN-DC is configured or not, after initial connection establishment, MCG SRBs (SRB1 and SRB2) can be configured by the network to use either E-UTRA PDCP or NR PDCP (either SRB1 and SRB2 are both configured with E-UTRA PDCP, or they are both configured with NR PDCP). Change from E-UTRA PDCP to NR PDCP (or vice-versa) is supported via a handover procedure (reconfiguration with mobility) or, for the initial change of SRB1 from E-UTRA PDCP to NR PDCP, with a reconfiguration without mobility before the initial security activation.

If the SN is a gNB (i.e. for EN-DC, NGEN-DC and NR-DC), the UE can be configured to establish a SRB with the SN (SRB3) to enable RRC PDUs for the SN to be sent directly between the UE and the SN. RRC PDUs for the SN can only be transported directly to the UE for SN RRC reconfiguration not requiring any coordination with the MN. Measurement reporting for mobility within the SN can be done directly from the UE to the SN if SRB3 is configured. Split SRB is supported for all MR-DC options, allowing duplication of RRC PDUs generated by the MN, via the direct path and via the SN. Split SRB uses NR PDCP. This version of the specification does not support the duplication of RRC PDUs generated by the SN via the MN and SN paths.

In EN-DC, the SCG configuration is kept in the UE during suspension. During connection resumption, if the UE supports resuming with EN-DC, the UE can be configured to release, restore, or reconfigure the SCG configuration. Otherwise, the UE releases the SCG configuration (but not the radio bearer configuration) during resumption initiation.

In MR-DC with 5GC, the UE stores the PDCP/SDAP configuration and the SCG configuration when moving to RRC Inactive. During connection resumption, if the UE supports resuming with MR-DC, the UE can be configured to release, restore, or reconfigure the SCG configuration. Otherwise, it releases the SCG configuration.

Figure 7:
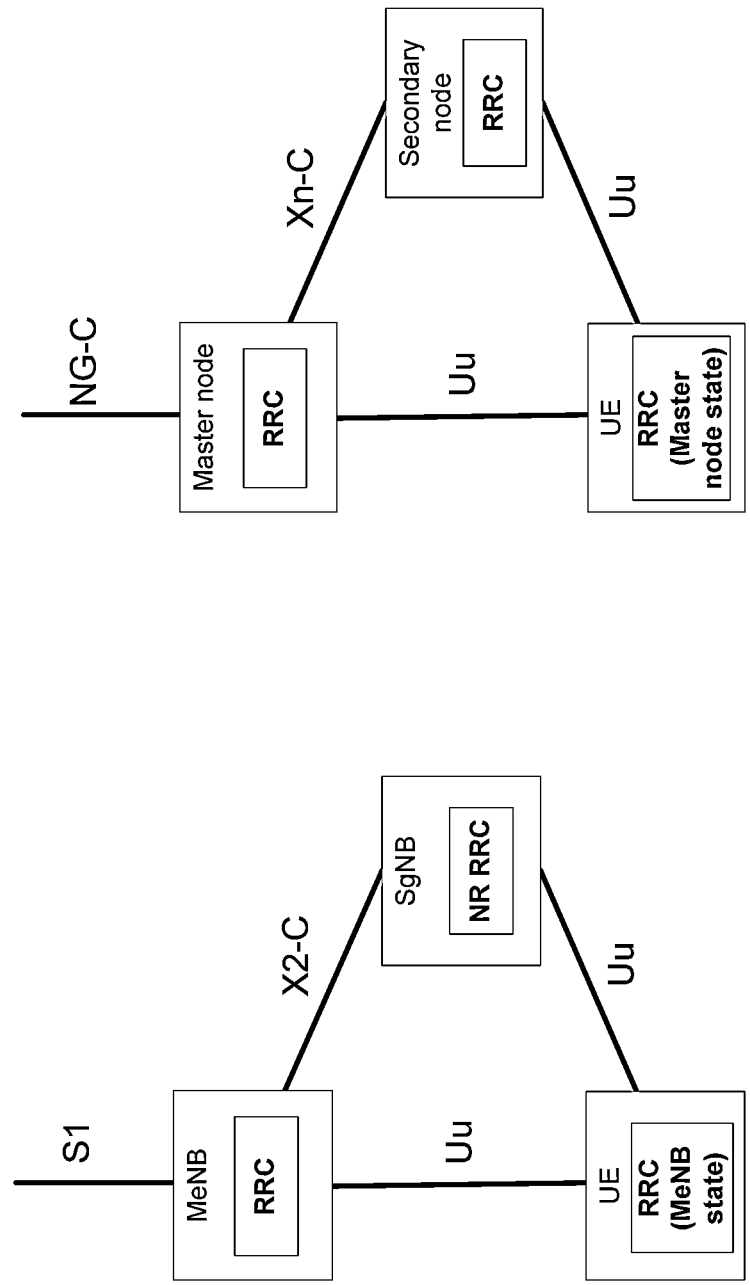
FIG. 7 is a reproduction of FIG. 4.2.1-1 of 3GPP TS 37.340 V17.0.0.0.

FIG. 4.2.1-1 of 3GPP TS 37.340 V17.0.0.0,
Entitled "Control plane architecture for EN-DC
(left) and MR-DC with 5GC (right)", is
Reproduced as FIG. 7

4.2.2 User Plane

In MR-DC, from a UE perspective, three bearer types exist: MCG bearer, SCG bearer and split bearer. These three bearer types are depicted in FIG. 4.2.2-1 for MR-DC with EPC (EN-DC) and in FIG. 4.2.2-2 for MR-DC with 5GC (NGEN-DC, NE-DC and NR-DC).

In E-UTRA connected to EPC, if the UE supports EN-DC, regardless whether EN-DC is configured or not, the network can configure either E-UTRA PDCP or NR PDCP for MN terminated MCG bearers while NR PDCP is always used for all other bearers. Change from E-UTRA to NR PDCP or vice-versa can be performed via a reconfiguration procedure (with or without handover), either using release and add of the DRBs or using the full configuration option.

In MR-DC with 5GC, NR PDCP is always used for all bearer types. In NGEN-DC, E-UTRA RLC/MAC is used in the MN while NR RLC/MAC is used in the SN. In NE-DC, NR RLC/MAC is used in the MN while E-UTRA RLC/MAC is used in the SN. In NR-DC, NR RLC/MAC is used in both MN and SN.

[ . . . ]

Figure 8:
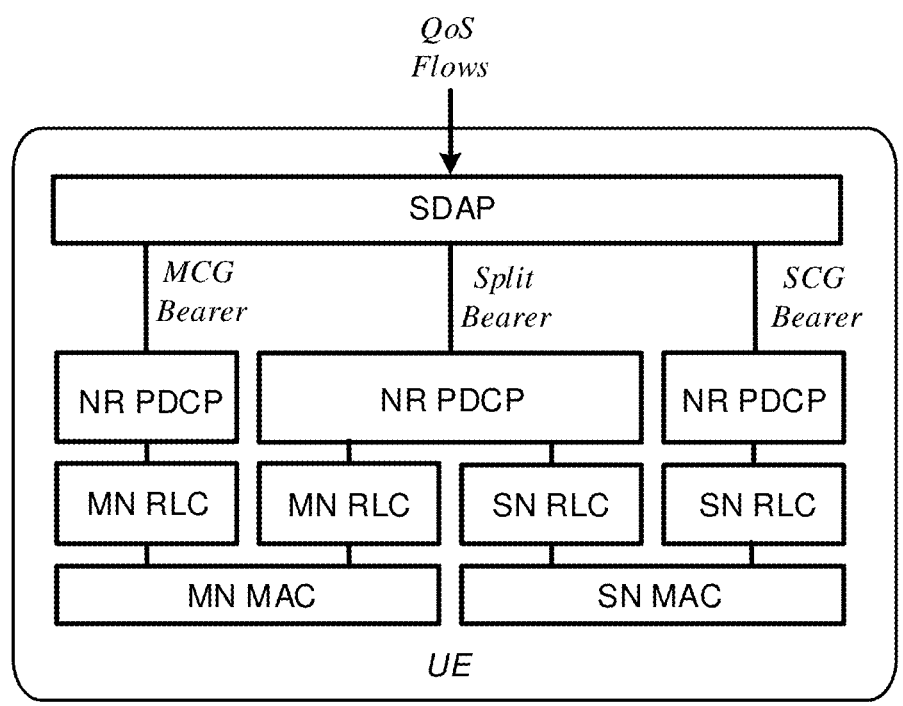
FIG. 8 is a reproduction of FIG. 4.2.2-2 of 3GPP TS 37.340 V17.0.0.0

FIG. 4.2.2-2 of 3GPP TS 37.340 V17.0.0.0, Entitled "Radio Protocol Architecture for MCG, SCG and Split Bearers from a UE Perspective in MR-DC with 5GC (NGEN-DC, NE-DC and NR-DC)", is Reproduced as FIG. 8

From a network perspective, each bearer (MCG, SCG and split bearer) can be terminated either in MN or in SN. Network side protocol termination options are shown in FIG. 4.2.2-3 for MR-DC with EPC (EN-DC) and in FIG. 4.2.2-4 for MR-DC with 5GC (NGEN-DC, NE-DC and NR-DC).

NOTE 1: Even if only SCG bearers are configured for a UE, for SRB1 and SRB2 the logical channels are always configured at least in the MCG, i.e. this is still an MR-DC configuration and a PCell always exists.

NOTE 2: If only MCG bearers are configured for a UE, i.e. there is no SCG, this is still considered an MR-DC configuration, as long as at least one of the bearers is terminated in the SN.

Figure 9:
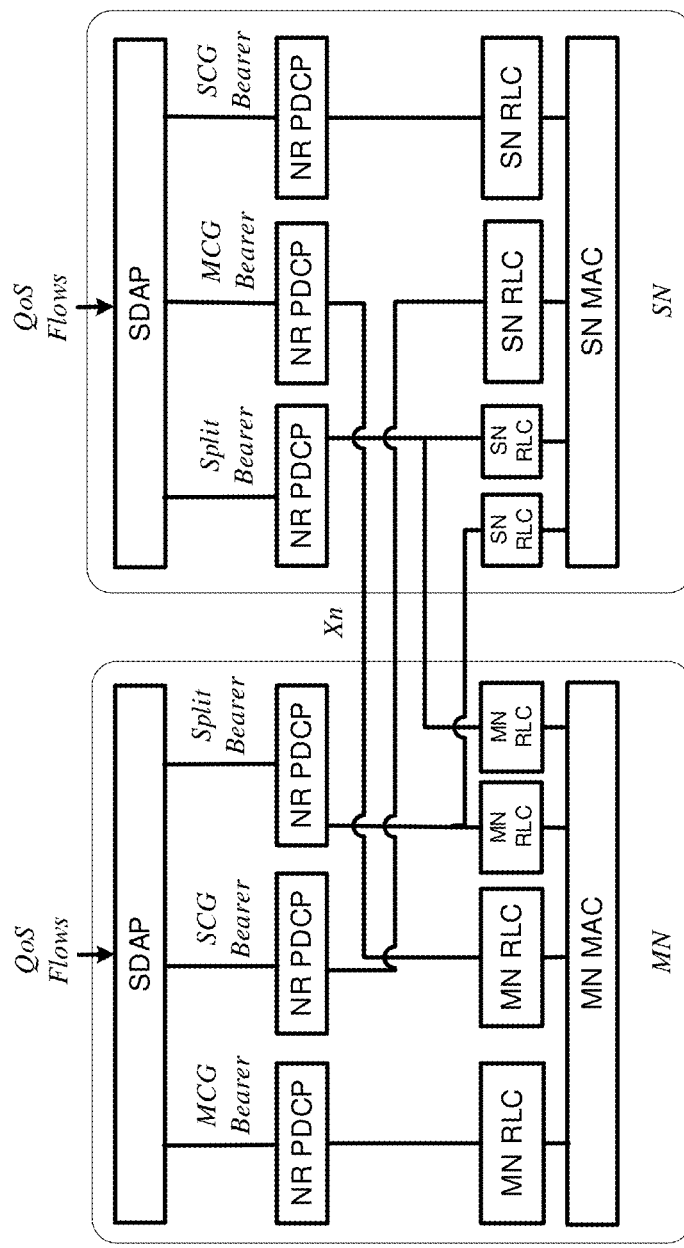
FIG. 9 is a reproduction of FIG. 4.2.2-4 of 3GPP TS 37.340 V17.0.0.0.

FIG. 4.2.2-4 of 3GPP TS 37.340 V17.0.0.0, Entitled "Network side protocol termination Options for MCG, SCG and Split Bearers in MR-DC with 5GC (NGEN-DC, NE-DC and NR-DC)", is Reproduced as FIG. 9

4.3 Network Interfaces
4.3.1 Control Plane
4.3.1.1 Common MR-DC Principles
In MR-DC, there is an interface between the MN and the SN for control plane signalling and coordination. For each MR-DC UE, there is also one control plane connection between the MN and a corresponding CN entity. The MN and the SN involved in MR-DC for a certain UE control their radio resources and are primarily responsible for allocating radio resources of their cells. FIG. 4.3.1.1-1 shows C-plane connectivity of MN and SN involved in MR-DC for a certain UE.

Figure 10:
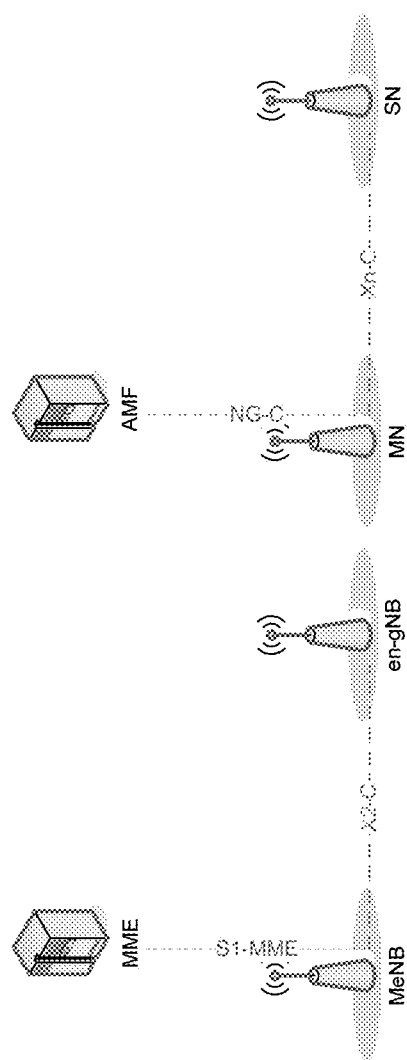
FIG. 10 is a reproduction of FIG. 4.3.1.1-1 of 3GPP TS 37.340 V17.0.0.0.

FIG. 4.3.1.1-1 of 3GPP TS 37.340 V17.0.0.0, Entitled "C-Plane Connectivity for EN-DC (Left) and MR-DC with 5GC (right)", is Reproduced as FIG. 10

4.3.1.2 MR-DC with EPC
In MR-DC with EPC (EN-DC), the involved core network entity is the MME. S1-MME is terminated in MN and the MN and the SN are interconnected via X2-C.
4.3.1.3 MR-DC with 5GC
In MR-DC with 5GC (NGEN-DC, NE-DC and NR-DC), the involved core network entity is the AMF. NG-C is terminated in the MN and the MN and the SN are interconnected via Xn-C.

4.3.2 User Plane
4.3.2.1 Common MR-DC Principles
There are different U-plane connectivity options of the MN and SN involved in MR-DC for a certain UE, as shown in FIG. 4.3.2.1-1. The U-plane connectivity depends on the bearer option configured:

For MN terminated bearers, the user plane connection to the CN entity is terminated in the MN;

For SN terminated bearers, the user plane connection to the CN entity is terminated in the SN;

The transport of user plane data over the Uu either involves MCG or SCG radio resources or both:

For MCG bearers, only MCG radio resources are involved;

For SCG bearers, only SCG radio resources are involved;

For split bearers, both MCG and SCG radio resources are involved.

For split bearers, MN terminated SCG bearers and SN terminated MCG bearers, PDCP data is transferred between the MN and the SN via the MN-SN user plane interface.

Figure 11:
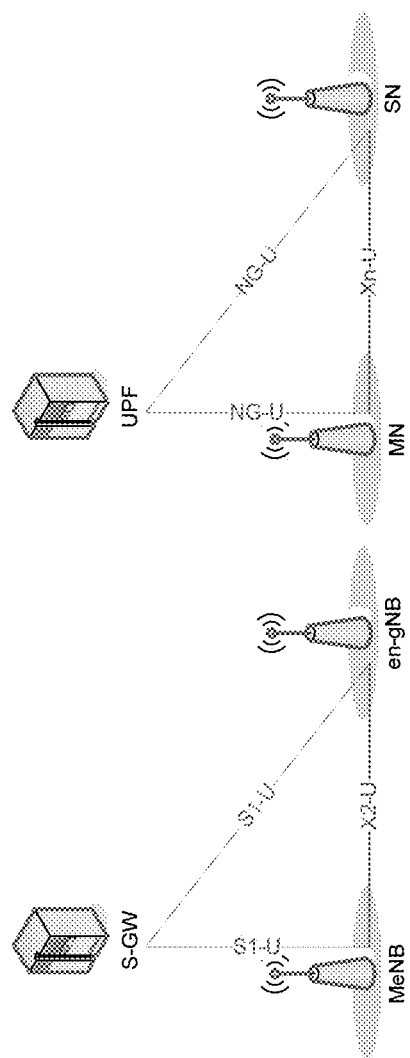
FIG. 11 is a reproduction of FIG. 4.3.2.1-1 of 3GPP TS 37.340 V17.0.0.0.

FIG. 4.3.2.1-1 of 3GPP TS 37.340 V17.0.0.0, Entitled "U-Plane Connectivity for EN-DC (left) and MR-DC with 5GC (right)", is Reproduced as FIG. 11

[ . . . ]
4.3.2.3 MR-DC with 5GC
For MR-DC with 5GC (NGEN-DC, NE-DC and inter-gNB NR-DC), Xn-U interface is the user plane interface between MN and SN, and NG-U is the user plane interface between the MN, the SN or both and the UPF.
[ . . . ]
6.3 PDCP Sublayer
In EN-DC, CA duplication (see [3]) can be applied in the MN and in the SN, but MCG bearer CA duplication can be configured only in combination with E-UTRAN PDCP and MCG bearer CA duplication can be configured only if DC duplication is not configured for any split bearer.
In NGEN-DC, CA duplication can only be configured for SCG bearer. In NE-DC, CA duplication can only be configured for MCG bearer. In NR-DC, CA duplication can be configured for both MCG and SCG bearers, and can be configured together with DC duplication.
In MR-DC, RoHC and EHC (as described in TS 36.323 and TS 38.323 [16]) can be configured for all the bearer types.
In MR-DC with 5GC, UDC (as described in TS 38.323 [16]) can be configured for all the bearer types.
6.4 SDAP Sublayer
In MR-DC with 5GC, the network may host up to two SDAP protocol entities for each individual PDU session, one for MN and another one for SN (see clause 8.1). The UE is configured with one SDAP protocol entity per PDU session.
[ . . . ]
3GPP TS 38.323 specifies the Packet Data Convergence Protocol (PDCP) architecture as follows:
4.2 Architecture
4.2.1 PDCP structure
FIG. 4.2.1.1 represents one possible structure for the PDCP sublayer; it should not restrict implementation. The figure is based on the radio interface protocol architecture defined in TS 38.300 [2].

Figure 12:
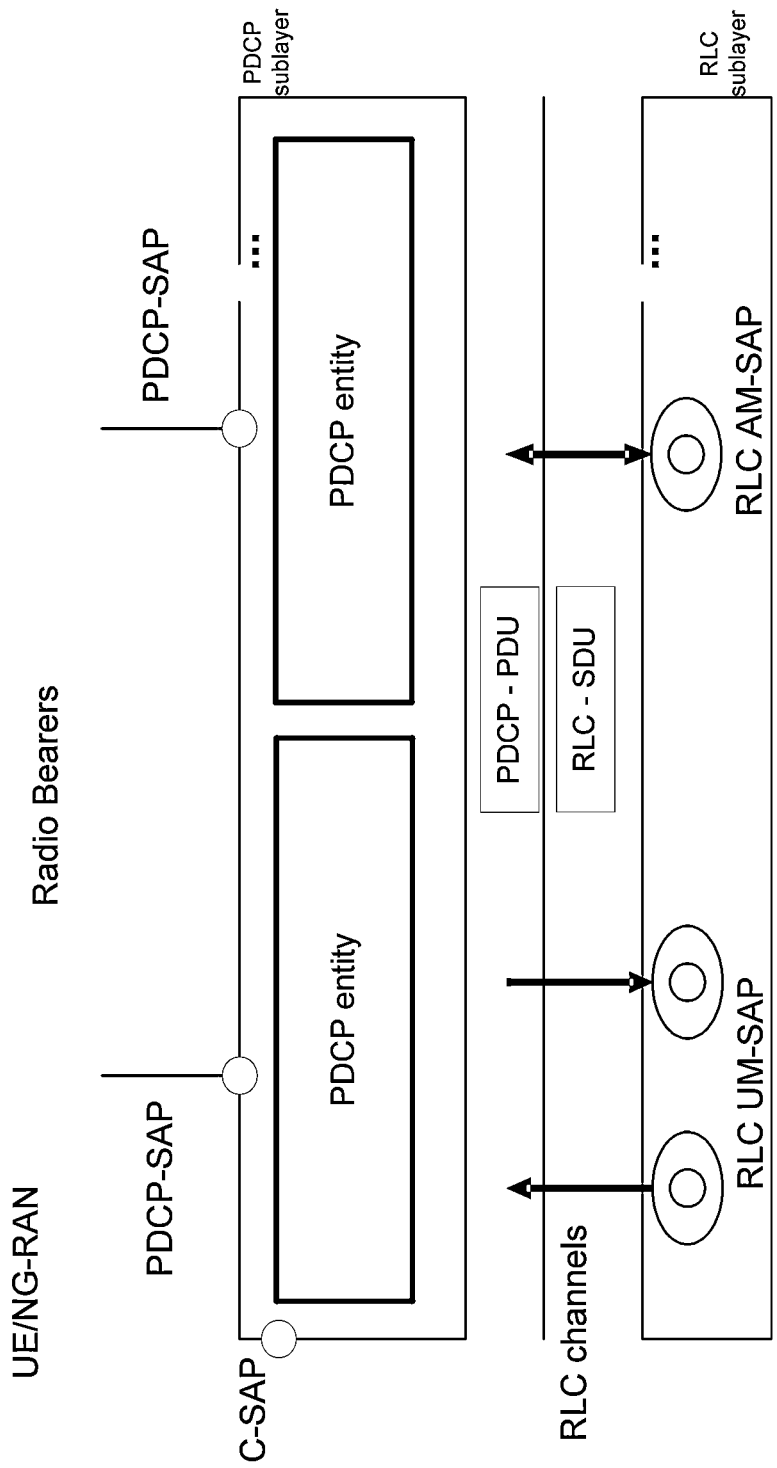
FIG. 12 is a reproduction of FIG. 4.2.1-1 of 3GPP TS 38.323 V17.0.0.

FIG. 4.2.1-1 of 3GPP TS 38.323 V17.0.0, Entitled "PDCP Layer, Structure View", is Reproduced as FIG. 12

The PDCP sublayer is configured by upper layers TS 38.331 [3]. The PDCP sublayer is used for RBs mapped on DCCH, DTCH, MTCH, SCCH, and STCH type of logical channels. The PDCP sublayer is not used for any other type of logical channels.

Each RB (except for SRB0 for Uu interface) is associated with one PDCP entity. Each PDCP entity is associated with one, two, three, four, six, or eight RLC entities depending on the RB characteristic (e.g. uni-directional/bi-directional or split/non-split) or RLC mode:
  For split bearers, each PDCP entity is associated with two UM RLC entities (for same direction), four UM RLC entities (two for each direction), or two AM RLC entities;
  For RBs configured with PDCP duplication, each PDCP entity is associated with N UM RLC entities (for same direction), 2×N UM RLC entities (N for each direction), or N AM RLC entities, where $2<=N<=4$;
  For DAPS bearers, each PDCP entity is associated with two UM RLC entities (for same direction, one for source and one for target cell), four UM RLC entities (two for each direction on source cell and target cell), or two AM RLC entities (one for source cell and one for target cell);
  For UM MRBs, each PDCP entity is associated with one UM RLC entity (for MTCH or for downlink DTCH), two UM RLC entities (one for MTCH and one for downlink DTCH, or one for downlink DTCH and one for uplink DTCH), or three UM RLC entities (one for MTCH, one for downlink DTCH, and one for uplink DTCH);
  For AM MRBs, each PDCP entity is associated with one AM RLC entity (for downlink DTCH and uplink DTCH), or one UM RLC entity (for MTCH) and one AM RLC entity (for downlink DTCH and uplink DTCH);
  Otherwise, each PDCP entity is associated with one UM RLC entity, two UM RLC entities (one for each direction), or one AM RLC entity.

4.2.2 PDCP Entities

The PDCP entities are located in the PDCP sublayer. Several PDCP entities may be defined for a UE. Each PDCP entity is carrying the data of one radio bearer. A PDCP entity is associated either to the control plane or the user plane depending on which radio bearer it is carrying data for.

FIG. 4.2.2-1 represents the functional view of the PDCP entity for the PDCP sublayer; it should not restrict implementation. The figure is based on the radio interface protocol architecture defined in TS 38.300 [2].

For split bearers and DAPS bearers, routing is performed in the transmitting PDCP entity.

A PDCP entity associated with DRB/MRB can be configured by upper layers TS 38.331 [3]to use header compression or uplink data compression (UDC). In this version of the specification, the robust header compression protocol (ROHC), the Ethernet header compression protocol (EHC) and UDC are supported. Each header compression protocol is independently configured for a DRB/MRB.

Figure 13:
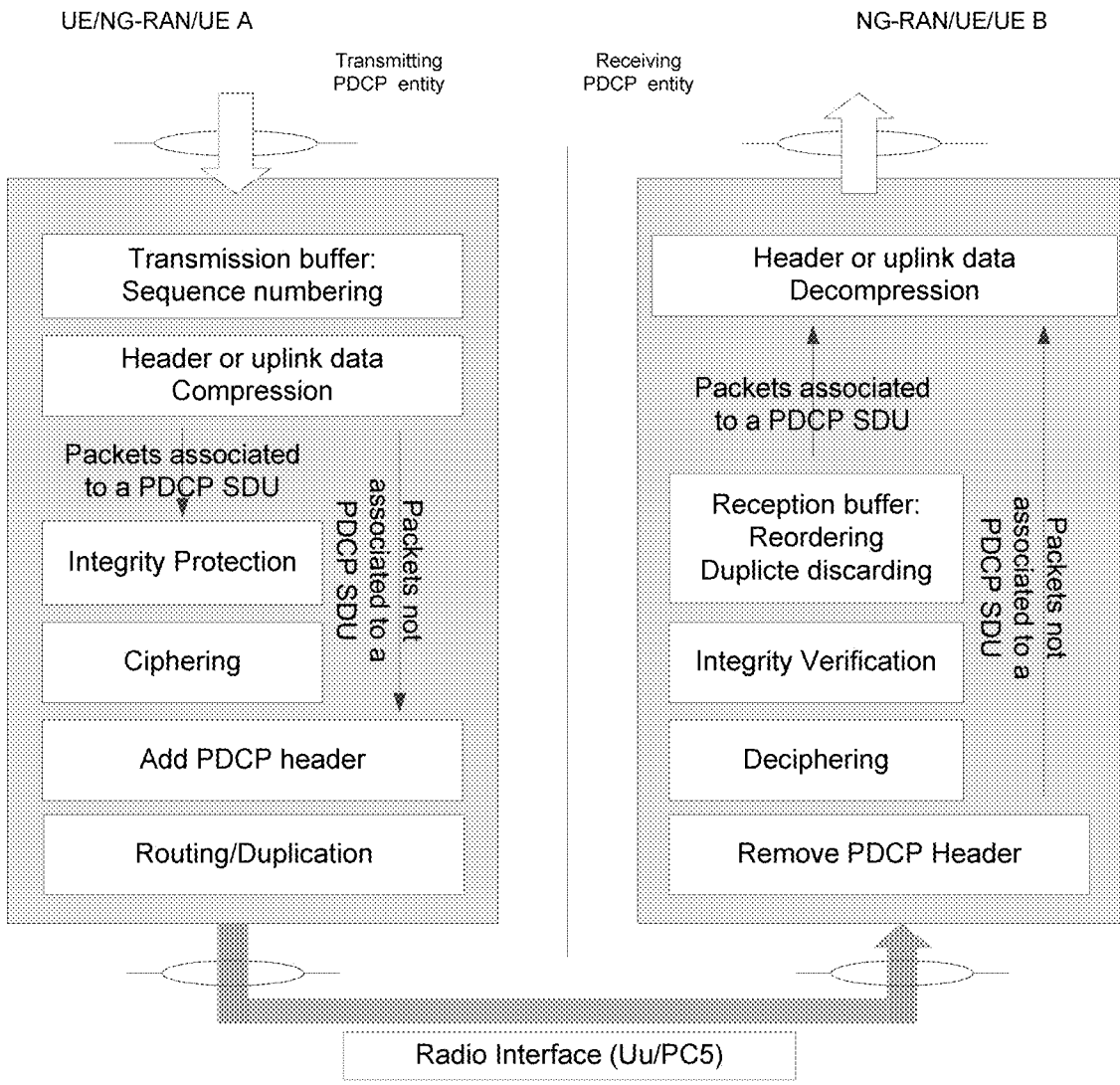
FIG. 13 is a reproduction of FIG. 4.2.2-1 of 3GPP TS 38.323 V17.0.0.

FIG. 4.2.2-1 of 3GPP TS 38.323 V17.0.0, Entitled "PDCP Layer, Functional View", is Reproduced as FIG. 13

FIG. 4.2.2-2 represents the functional view of the PDCP entity associated with the DAPS bearer for the PDCP sublayer; it should not restrict implementation. The figure is based on the radio interface protocol architecture defined in TS 38.300 [2].

[. . . ]

5.11 PDCP Duplication 5.11.1 Activation/Deactivation of PDCP Duplication

For the PDCP entity configured with pdcp-Duplication, the transmitting PDCP entity shall:
  for SRBs:
    activate the PDCP duplication;
  for DRBs:
    if the activation of PDCP duplication is indicated for the DRB:
      activate the PDCP duplication for the DRB;
    if the activation of PDCP duplication is indicated for at least one associated RLC entities:
      activate the PDCP duplication for the indicated associated RLC entities;
      activate the PDCP duplication for the DRB;
    if the deactivation of PDCP duplication is indicated for the DRB:
      deactivate the PDCP duplication for the DRB;
    if the deactivation of PDCP duplication is indicated for at least one associated RLC entities:
      deactivate the PDCP duplication for the indicated associated RLC entities;
      if all associated RLC entities other than the primary RLC entity are deactivated for PDCP duplication:
        deactivate the PDCP duplication for the DRB.

5.11.2 Duplicate PDU Discard

For the PDCP entity configured with pdcp-Duplication, the transmitting PDCP entity shall:
  if the successful delivery of a PDCP Data PDU is confirmed by one of the associated AM RLC entities:
    indicate to the other AM RLC entities to discard the duplicated PDCP Data PDU;
  if the deactivation of PDCP duplication is indicated for the DRB:
    indicate to the RLC entities other than the primary RLC entity to discard all duplicated PDCP Data PDUs;
  if the deactivation of PDCP duplication is indicated for at least one associated RLC entities:
    indicate to the RLC entities deactivated for PDCP duplication to discard all duplicated PDCP Data PDUs.

3GPP TS 38.351 specifies the functionalities of the Sidelink Relay Adaptation Protocol (SRAP) sublayer as follows:

4 General 4.1 Introduction

The objective is to describe the SRAP architecture and the SRAP entities from a functional point of view.

4.2 SRAP Architecture 4.2.1 General

This clause describes a model of the SRAP, i.e., it does not specify or restrict implementations.

4.2.2 SRAP Entities

FIG. 4.2.2-1 represents one possible structure for the SRAP sublayer. The figure is based on the radio interface protocol architecture defined in TS 38.300 [2].

Figure 14:
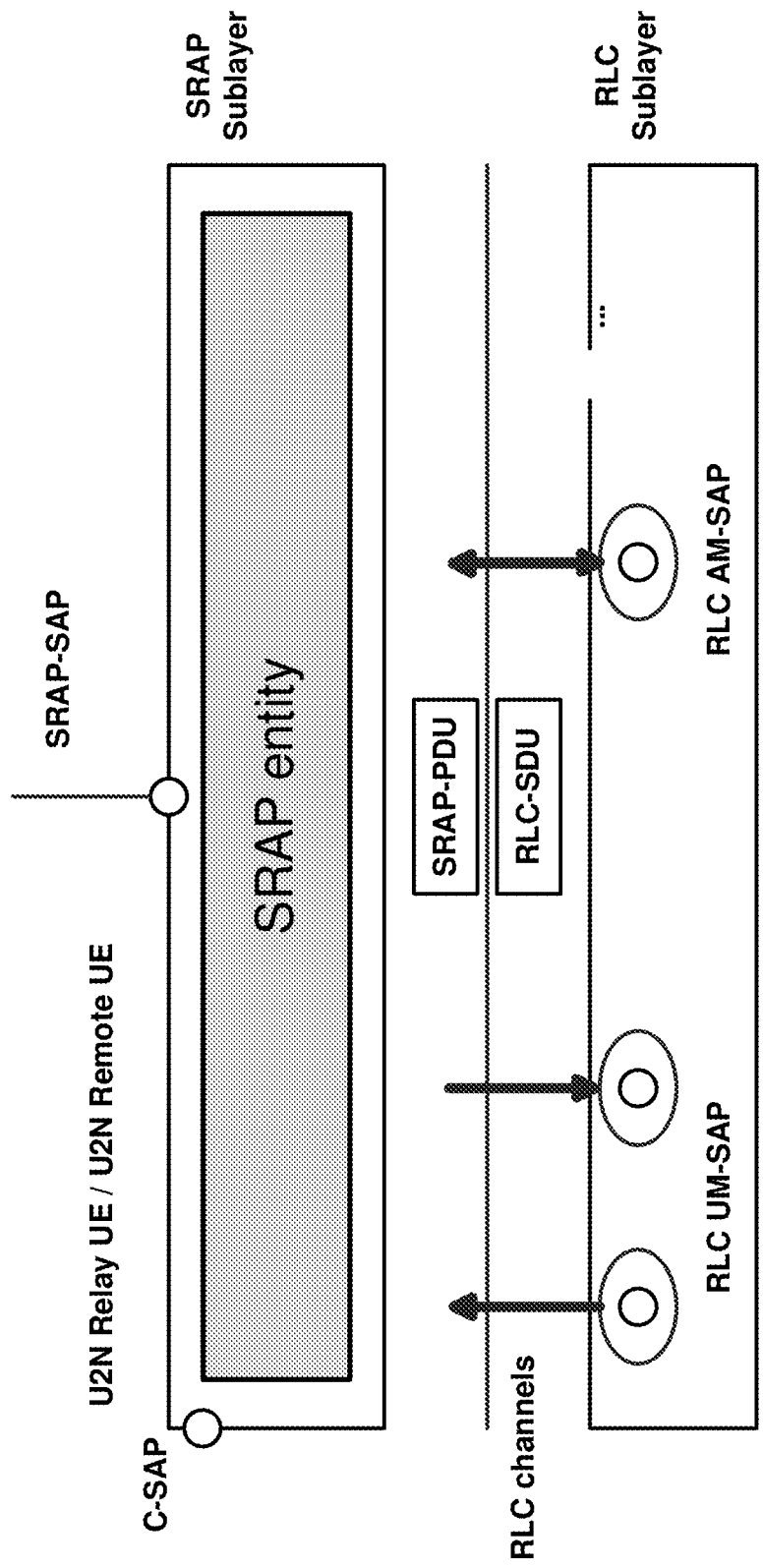
FIG. 14 is a reproduction of FIG. 4.2.2-1 of 3GPP TS 38.351 V17.0.0.

FIG. 4.2.2-1 of 3GPP TS 38.351 V17.0.0, Entitled "SRAP Structure Overview", is Reproduced as FIG. 14

On the U2N Relay UE, the SRAP sublayer contains one SRAP entity at Uu interface and a separate collocated SRAP entity at the PC5 interface. On the U2N Remote UE, the SRAP sublayer contains only one SRAP entity at the PC5 interface.

Each SRAP entity has a transmitting part and a receiving part. Across the PC5 interface, the transmitting part of the SRAP entity at the U2N Remote UE has a corresponding receiving part of an SRAP entity at the U2N Relay UE, and vice versa. Across the Uu interface, the transmitting part of the SRAP entity at the U2N Relay UE has a corresponding receiving part of an SRAP entity at the gNB, and vice versa. FIG. 4.2.2-2 and FIG. 4.2.2-3 represents the functional view of the SRAP entity for the SRAP sublayer at PC5 interface and at Uu interface respectively.

Figure 15:
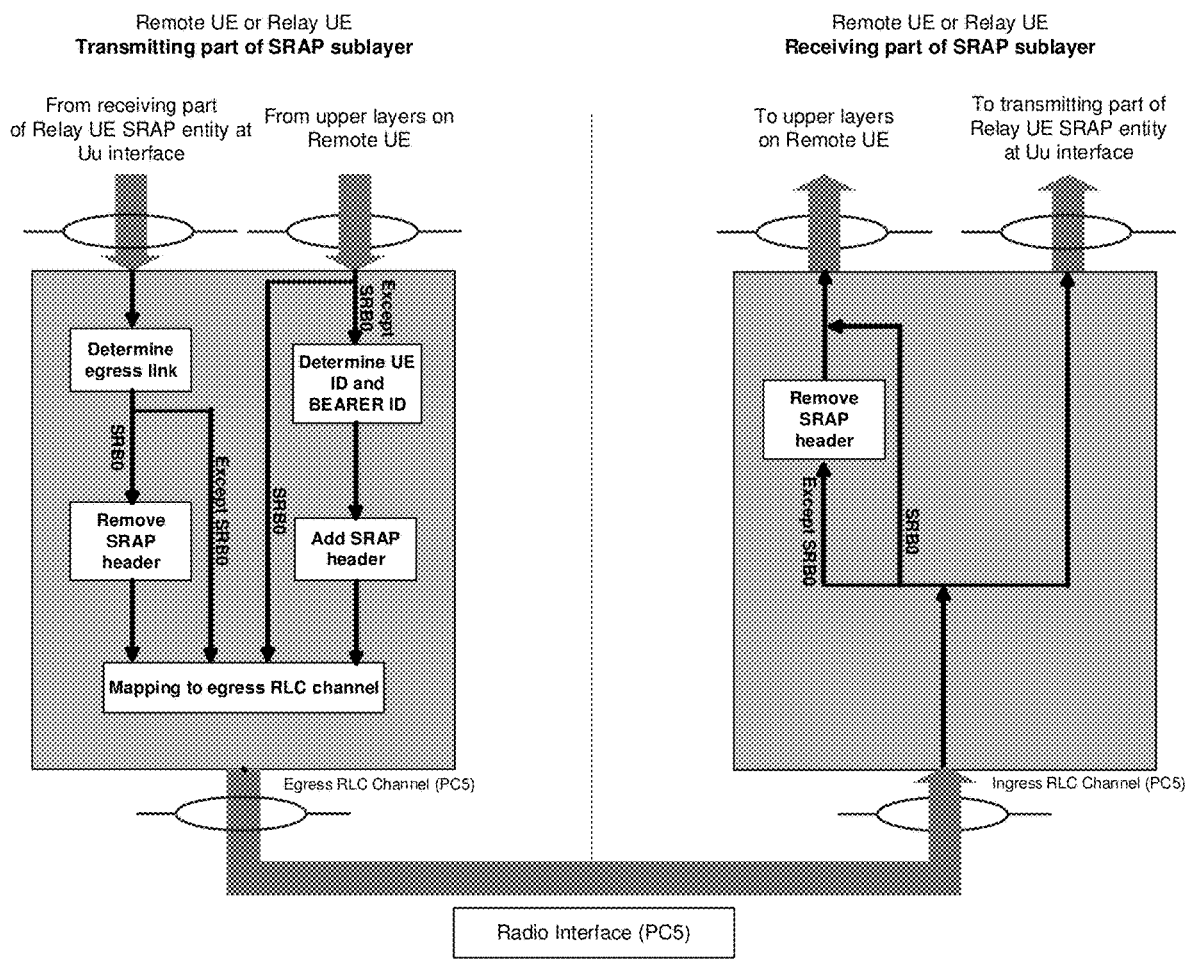
FIG. 15 is a reproduction of FIG. 4.2.2-2 of 3GPP TS 38.351 V17.0.0.

FIG. 4.2.2-2 of 3GPP TS 38.351 V17.0.0, Entitled "Example of Functional View of SRAP Sublayer at PC5 Interface", is Reproduced as FIG. 15

FIG. 4.2.2-3 of 3GPP TS 38.351 V17.0.0, Entitled "Example of Functional View of SRAP Sublayer at Uu Interface", is Reproduced as FIG. 16

In the example of FIG. 4.2.2-2 and FIG. 4.2.2-3, at relay UE:
The receiving part on the SRAP entity of Uu interface delivers SRAP Data PDUs to the transmitting part on the collocated SRAP entity of PC5 interface, and the receiving part on the SRAP entity of PC5 interface delivers SRAP Data PDUs to the transmitting part on the collocated SRAP entity of Uu interface, except for data packet for SRB0 (i.e., received from SL-RLC0 as specified in TS 38.331 [3]). As an alternative mode, the receiving part may deliver SRAP SDUs to the transmitting part on the collocated SRAP entity. When passing SRAP SDUs, the receiving part removes the SRAP header and the transmitting part adds the SRAP header with the same SRAP header content as carried on the SRAP Data PDU header prior to removal. Passing SRAP SDUs in this manner is therefore functionally equivalent to passing SRAP Data PDUs, in implementation. The following specification therefore refers to the passing of SRAP data packets in supporting the alternative mode.

For data packet corresponding to SRB0, the receiving part on the SRAP entity of PC5 interface delivers SRAP SDUs to the transmitting part on the collocated SRAP entity of Uu interface, and the transmitting part on the SRAP entity of Uu interface adds the SRAP header in accordance with clause 5.3.3.

For data packet for SRB0, the receiving part on the SRAP entity of Uu interface delivers SRAP Data PDUs to the transmitting part on the collocated SRAP entity of PC5 interface, and the transmitting part on the SRAP entity of PC5 interface removes the SRAP header in accordance with clause 5.2.2.

4.3 Services
4.3.1 Services Provided to Upper Layers
The following services are provided by the SRAP sublayer to upper layers:
Data transfer.
4.3.2 Services Expected From Lower Layers
An SRAP sublayer expects the following services from lower layers per RLC entity (for a detailed description see TS 38.322 [4]):
Acknowledged data transfer service;
Unacknowledged data transfer service.

4.4 Functions
The SRAP sublayer supports the following functions:
Data transfer;
Determination of UE ID field and BEARER ID field for data packets;
Determination of egress link;
Determination of egress RLC channel.
4.5 Configurations
The configuration of the SRAP entity for U2N Remote UE includes:
Mapping from a radio bearer identified by BEARER ID field to egress PC5 Relay RLC channel via RRC;
The local identity via RRC.
The configuration of the SRAP entity for U2N Relay UE includes:
The local identity for each U2N Remote UE via RRC;
Mapping from UE ID field and BEARER ID field to egress Uu Relay RLC channel for each U2N Remote UE via RRC;
Mapping from UE ID field and BEARER ID field to egress PC5 Relay RLC channel for each U2N Remote UE via RRC.

3GPP TR 23.700-33 is a technical report for study on system enhancement for Proximity based Services (ProSe) in the 5G System (5GS). Key issue #5 included in the technical report and related solutions for the issue are provided below:

5.5 Key Issue #5: Support of Multi-Path Transmission for UE-to-Network Relay
5.5.1 General Description
Multi-path transmission using only one direct network communication path and only one indirect network communication path with UE-to-Network Relay can be used to improve reliability or data rates for the Remote UE. As illustrated in FIG. 5.5.1-1, a UE can use path #1 and path #2 for multi-path transmission, where path #1 is direct network communication path, and path #2 is indirect network communication path with UE-to-Network Relay.

Figure 17:
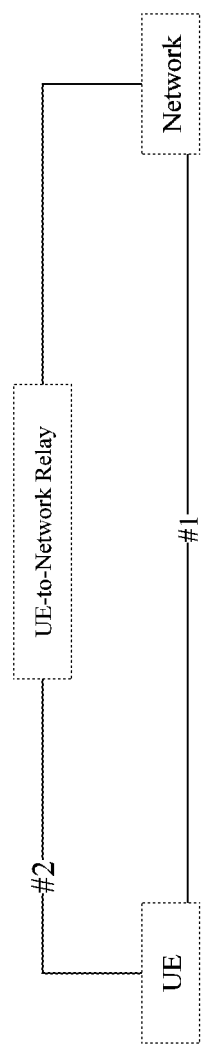
FIG. 17 is a reproduction of FIG. 5.5.1-1 of 3GPP TR 23.700-33 V0.2.0.

FIG. 5.5.1-1 of 3GPP TR 23.700-33 V0.2.0, Entitled "Example Scenario of Multi-Path Transmission Using UE-to-Network Relay", is Reproduced as FIG. 17

At least the following aspects needs to be studied:
Whether and how the network authorizes and the triggers for connection establishment for multi-path transmission, including:
Whether and how to authorise a Remote UE to use the multi-path transmission for specific ProSe service(s).
What information is required for and how does a Remote UE or UE-to Network Relay or the network trigger the multi-path connection establishment.
How to provide/update the rules for multiple-path transmission.
Whether and how to enhance the existing procedures to establish/modify/release a connection for multi-path transmission.
NOTE 1: Coordination with RAN WGs is needed for RAN dependency.
NOTE 2: For security aspects, coordination with SA WG3 is needed.
NOTE 3: This KI covers both Layer-2 and Layer-3 UE-to-Network Relay cases.
[ . . . ]

6.29 Solution #29: Multi-Path Transmission for UE-to-Network Relay
6.29.1 Description
In this solution, it proposes to reuse existing procedure as much as possible. It is assumed that the UE subscribes to the multi-path transmission service. And network can provision the authorization and policy parameters for multi-path transmission service to UE as existing mechanism specified in TS 23.304 [3].
Editor's note: The details for how to provision the authorization and policy parameters for multi-path transmission service is FFS.
Editor's note: Whether this solution applies L2 is FFS.
Editor's note: How to subscribe to the multi-path transmission service is FFS.
6.29.2 Procedures
In case A, UE has established Uu connection to deliver traffic to the target DN. When UE is authorized to use the multi-path transmission service. UE triggers to discover the UE-to-Network Relay and try to establish connection to the same target for data traffic as existing mechanism specified in TS 23.304 [3].
In case B, UE has established 3GPP connection to the target DN via UE-to-Network Relay. When UE is authorized to use the multi-path transmission service. UE triggers to establish 3GPP connection via Uu as specified in TS 23.502 [8], e.g. establishing PDU session to deliver the traffic to the same DN.
For both case A and case B, How to integrate the traffic from both Uu connection and connection via UE-to-Network Relay is up to application layer.
6.29.3 Impacts on services, entities and interfaces
No impact on 3GPP.
[ . . . ]

According to 3GPP TS 38.300, when duplication is configured for a radio bearer by Radio Resource Control (RRC), at least one secondary Radio Link Control (RLC) entity is added to the radio bearer to handle the duplicated Packet Data Convergence Protocol (PDCP) Protocol Data Units (PDUs) as depicted on FIG. 16.1.3-1 (reproduced as FIG. 6) of 3GPP TS 38.300 V17.0.0, where the logical channel corresponding to the primary RLC entity is referred to as the primary logical channel, and the logical channel corresponding to the secondary RLC entity(ies), the secondary logical channel(s). All RLC entities have the same RLC mode. Duplication at PDCP therefore consists in submitting the same PDCP PDUs multiple times: once to each activated RLC entity for the radio bearer. With multiple independent transmission paths, packet duplication therefore increases reliability and reduces latency and is especially beneficial for Ultra-Reliable and Low Latency Communications (URLLC) services.

When configuring duplication for a data radio bearer (DRB), RRC also sets the state of PDCP duplication (either activated or deactivated) at the time of (re-)configuration. After the configuration, the PDCP duplication state can then be dynamically controlled by means of a Medium Access Control (MAC) control element. When duplication is activated, the original PDCP PDU and the corresponding duplicate(s) shall not be transmitted on the same carrier. The logical channels of a radio bearer configured with duplication can either belong to the same MAC entity (referred to as Carrier Aggregation (CA) duplication) or to different ones (referred to as Duel Connectivity (DC) duplication). CA duplication can also be configured in either or both of the MAC entities together with DC duplication when duplication over more than two RLC entities is configured for the radio bearer. In CA duplication, logical channel mapping restrictions are used in a MAC entity to ensure that the different logical channels of a radio bearer in the MAC entity are not sent on the same carrier.

UE-to-Network (U2N) Relay is supported in Release 17, which means a relay UE will be used to support communication between a remote UE and the network in case the remote UE cannot access the network directly. There are two different types of solutions for U2N Relay i.e. a Layer-2 (based) U2N Relay and a Layer-3 (based) U2N Relay.

Both Model A discovery and Model B discovery are supported for the remote UE to discover a U2N Relay. Model A uses a single discovery protocol message (i.e. Discovery Announcement) and Model B uses two discovery protocol messages (i.e. Discovery Solicitation and Discovery Response). In case there are multiple relay UEs in proximity of the remote UE, one of the relay UEs will be selected based on e.g. measurement results on the discovery messages transmitted by different relay UEs. After selecting a suitable relay UE, the remote UE will then establish a PC5 unicast link with the relay UE to support U2N Relay operation.

To access a concerned service from a data network (DN), a PDU session should be established with the DN and the PDU Session Establishment Request message includes an Single Network Slice Selection Assistance Information (S-NSSAI) and a Data Network Name (DNN) associated with the PDU session. In the Layer-2 U2N Relay solution, the remote UE establishes a PDU session with the network via the relay UE, while the relay UE establishes the PDU session with the network for the remote UE in the Layer-3 U2N Relay solution.

Key issue #5 in 3GPP TR 23.700-33 describes support of multi-path transmission for UE-to-Network (U2N) Relay in Release 18. Multi-path transmission uses only one direct network communication path and only one indirect network communication path with UE-to-Network Relay in this release. This does not exclude more than one direct network communication path and/or more than one indirect network communication path for future releases.

3GPP TS 37.340 specifies NR Dual connectivity (NR-DC). According to FIG. 4.2.2-2 (reproduced as FIG. 8) and FIG. 4.2.2-4 (reproduced as FIG. 9) in 3GPP TS 37.340 V17.0.0, there may be 3 different bearer types to support NR-DC, i.e. Master Cell Group (MCG) Bearer, Secondary Cell Group (SCG) Bearer, and Split Bearer. An MCG bearer is a radio bearer with an RLC bearer (or entity) only in the MCG, an SCG bearer is a radio bearer with an RLC bearer (or entity) only in the SCG, and a split bearer is a radio bearer with RLC bearers (or entities) both in MCG and SCG. Each bearer may be terminated in the Master Node (MN) or the Secondary Node (SN). Similar to NR-DC, it is possible that there may also be 3 different bearer types to support multi-path transmission in NR:

(1) Direct Bearer: a radio bearer with an RLC bearer (or RLC entity) only in the direct network communication path i.e. a Uu RLC bearer or entity.
(2) Indirect Bearer: a radio bearer with an RLC bearer (or RLC entity) only in the indirect network communication path i.e. a PC5 (or SL) RLC bearer or entity.
(3) Split Bearer: a radio bearer with RLC bearers (or RLC entities) both in the direct network communication path and the indirect network communication path.

Figure 18:
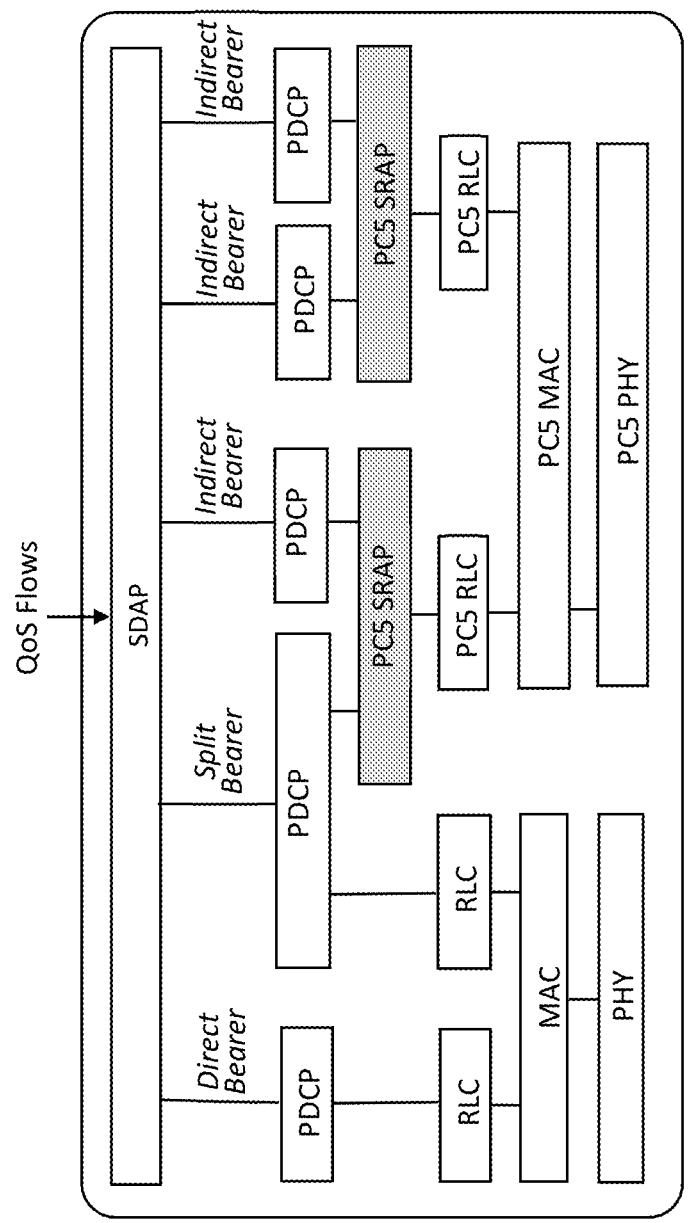
FIG. 18 illustrates bearer types for supporting multi-path transmission in a (remote) UE according to one exemplary embodiment.

An exemplary diagram of the above 3 bearer types in a (remote) UE for supporting multi-path transmission with a Layer-2 U2N Relay is illustrated in FIG. 18. FIG. 18 illustrates bearer types for supporting multi-path transmission in a (remote) UE according to one exemplary embodiment. In FIG. 18, a Split Bearer and an Indirect Bearer may share the same PC5 RLC entity. It is also possible that a PC5 RLC entity is owned by only a Split Bearer. In this situation, the PC5 SRAP layer (or entity) may not be needed for the Split Bearer.

It is possible that duplication may also be applied to multi-path transmission. Thus, a radio bearer in Release 18 may be configured with one or more than one RLC entity. According to 3GPP TS 38.300 and TS 38.323, when an RLC entity acknowledges the transmission of a PDCP PDU (or the successful delivery of the PDCP PDU is confirmed by the RLC entity), the PDCP entity shall indicate to the other RLC entity of the radio bearer to discard the duplicated PDCP PDU. However, in case of multi-path transmission, an RLC acknowledgement with respect to the transmission of a PDCP PDU over the indirect path only means the U2N relay has received the PDCP PDU. It is uncertain whether the gNB can receive the PDCP PDU. This PDCP PDU might still get lost if the radio link between the U2N relay and the gNB is poor. Thus, the PDCP entity shall not indicate to the other RLC entity over the direct path to discard this PDCP PDU. On the other hand, the PDCP entity could still indicate to other RLC entity over the indirect path to discard the PDCP PDU if an RLC acknowledgement with respect to the transmission of a PDCP PDU over the direct path is received.

In one embodiment, the radio bearer is a split bearer. It may be a data radio bearer (DRB) or a signaling radio bearer (SRB). The PDCP entity is established by the UE for the radio bearer. The PDCP PDU is a PDCP Data PDU. And, the RLC entity is an AM RLC entity. Besides, a PDU session is established between the UE and the network and the UE and the network communicate with each other during the PDU session.

An alternative solution could be that the RLC entity, in the remote UE, associated with the PDCP entity does not acknowledge the successful transmission of the PDCP PDU to the PDCP entity so as not to trigger PDCP PDU discarding in the other RLC entity over the direct path.

If an SRAP sublayer is placed between the PDCP sublayer and PC5 RLC sublayer to support multi-path transmission with a Layer-2 U2N Relay as shown in FIG. 18, an SRAP entity will be established in the UE for mapping a DRB to a PC5 Relay RLC channel (or a PC5 RLC entity). In this situation, information or indications to be exchanged between the PDCP entity and the PC5 RLC entity associated with the DRB will be forwarded by the SRAP entity. For example, the SRAP entity would forward or deliver the PDCP PDU successful delivery information from the PC5 RLC entity to the PDCP entity and the PDCP PDU discard indication from the PDCP entity to the PC5 RLC entity.

As discussed above, the PDCP entity shall not indicate to the other RLC entity associated with the direct path to discard a PDCP PDU if successful delivery of the PDCP PDU is confirmed by the RLC entity associated with the indirect path. Alternatively, it is feasible for the RLC entity associated with the indirect path not to deliver information of PDCP PDU successful delivery to the upper layers (e.g. the SDAP entity and/or the PDCP entity). Accordingly, the PDCP entity would not trigger the corresponding PDCP PDU discard in the direct path.

Figure 19:
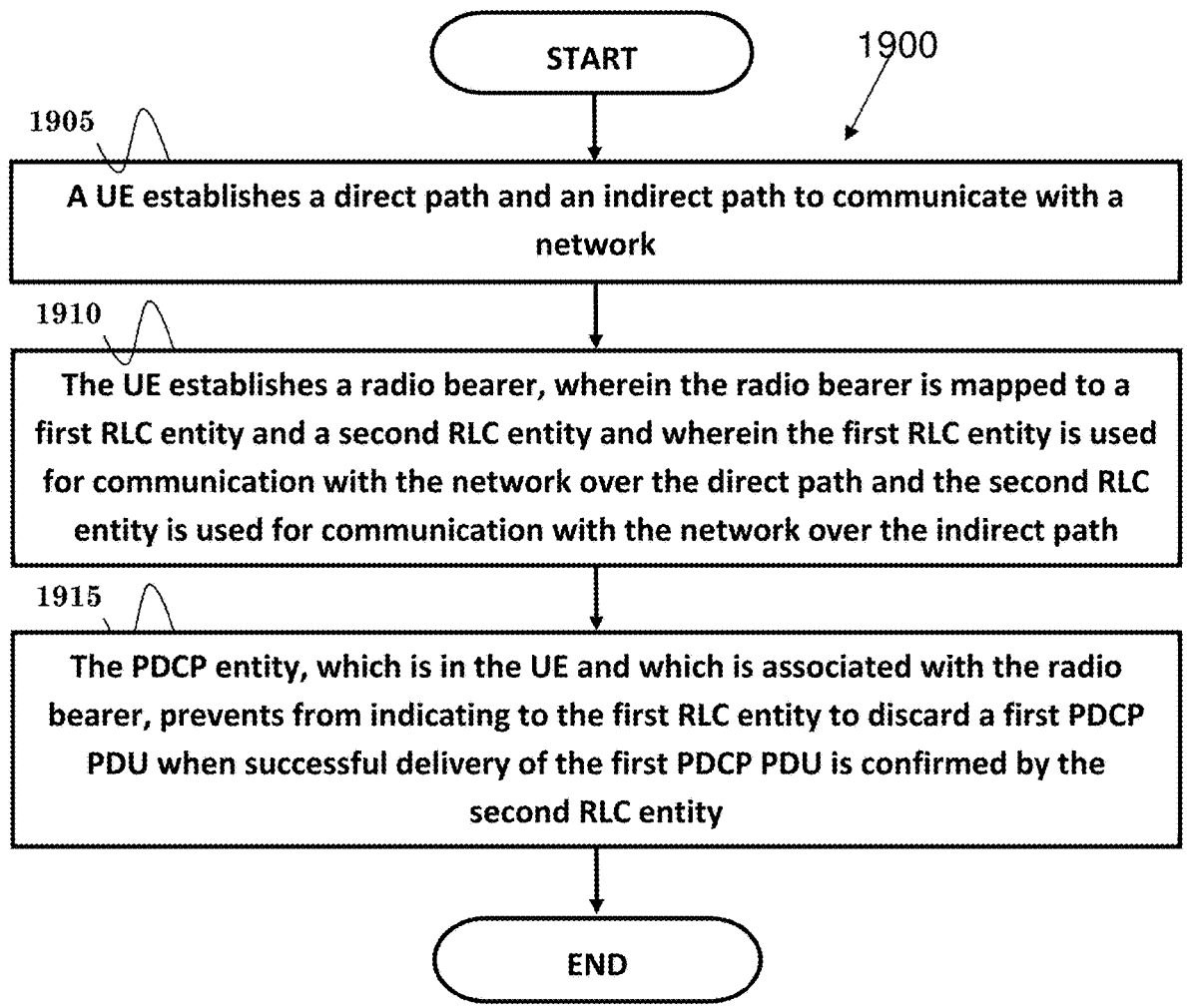
FIG. 19 is a flow chart according to one exemplary embodiment.

FIG. 19 is a flow chart 1900 of a method for duplicate PDU discarding. In step 1905, a UE establishes a direct path and an indirect path to communicate with a network. In step 1910, the UE establishes a radio bearer, wherein the radio bearer is mapped to a first RLC entity and a second RLC entity and wherein the first RLC entity is used for communication with the network over the direct path and the second RLC entity is used for communication with the network over the indirect path. In step 1915, a PDCP entity, which is in the UE and which is associated with the radio bearer, prevents from indicating to the first RLC entity to discard a first PDCP PDU when successful delivery of the first PDCP PDU is confirmed by the second RLC entity.

In one embodiment, the direct path could be established via a base station. The indirect path could be established via a Layer-2 UE-to-Network relay UE. The radio bearer could be a split bearer, or a Data Radio Bearer (DRB).

In one embodiment, the first RLC entity and the second RLC entity could be Acknowledged Mode (AM) RLC entities. The first RLC entity could be a Uu RLC entity, and the second RLC entity could be a PC5 RLC entity.

In one embodiment, the PDCP entity, which is in the UE and which is associated with the radio bearer, could indicate to the second RLC entity to discard a second PDCP PDU when successful delivery of the second PDCP PDU is confirmed by the first RLC entity. A Sidelink Relay Adaptation Protocol (SRAP) entity between the PDCP entity and the second RLC entity could indicate to the second RLC entity to discard the second PDCP PDU due to a request from the PDCP entity.

In one embodiment, the PDCP entity could be established by the UE for the radio bearer. The first PDCP PDU and the second PDCP PDU could be PDCP Data PDUs.

Referring back to FIGS. 3 and 4, in one exemplary embodiment of a method for a UE, the UE 300 includes a program code 312 stored in the memory 310. The CPU 308 could execute program code 312 to enable the UE (i) to establish a direct path and an indirect path to communicate with a network, (ii) to establish a radio bearer, wherein the radio bearer is mapped to a first RLC entity and a second RLC entity and wherein the first RLC entity is used for communication with the network over the direct path and the second RLC entity is used for communication with the network over the indirect path, and (iii) to prevent from indicating, from a Packet Data Convergence Protocol (PDCP) entity which is in the UE and which is associated with the radio bearer, to the first RLC entity to discard a first PDCP PDU when successful delivery of the first PDCP PDU is confirmed by the second RLC entity. Furthermore, the CPU 308 can execute the program code 312 to perform all of the above-described actions and steps or others described herein.

Basically, when packet duplication is configured for a data radio bearer (DRB) in Release 17, multiple logical channels may be configured for the DRB. Part of the logical channels may belong to the MCG and the others may belong to the SCG. Since the MCG and the SCG may be deployed at different locations, the distance between a UE and the MCG and that between the UE and the SCG may vary. If the UE moves away from the SCG, the radio signal strength would become weak. In this situation, it is beneficial for the network to add an indirect path (i.e. a communication path via a Layer-2 UE-to-Network Relay) to replace the communication path via SCG, which means the SCG is released and the indirect path is added by the network via a RRC message (e.g. a RRC Reconfiguration message). More specifically, all logical channels of the SCG configured to DRBs of the UE are replaced by PC5 Relay RLC channels of the indirect path. This may be achieved by releasing the SCG configuration and adding a configuration of the indirect path which may include PC5 Relay RLC channels mapped to the DRBs.

Figure 20:
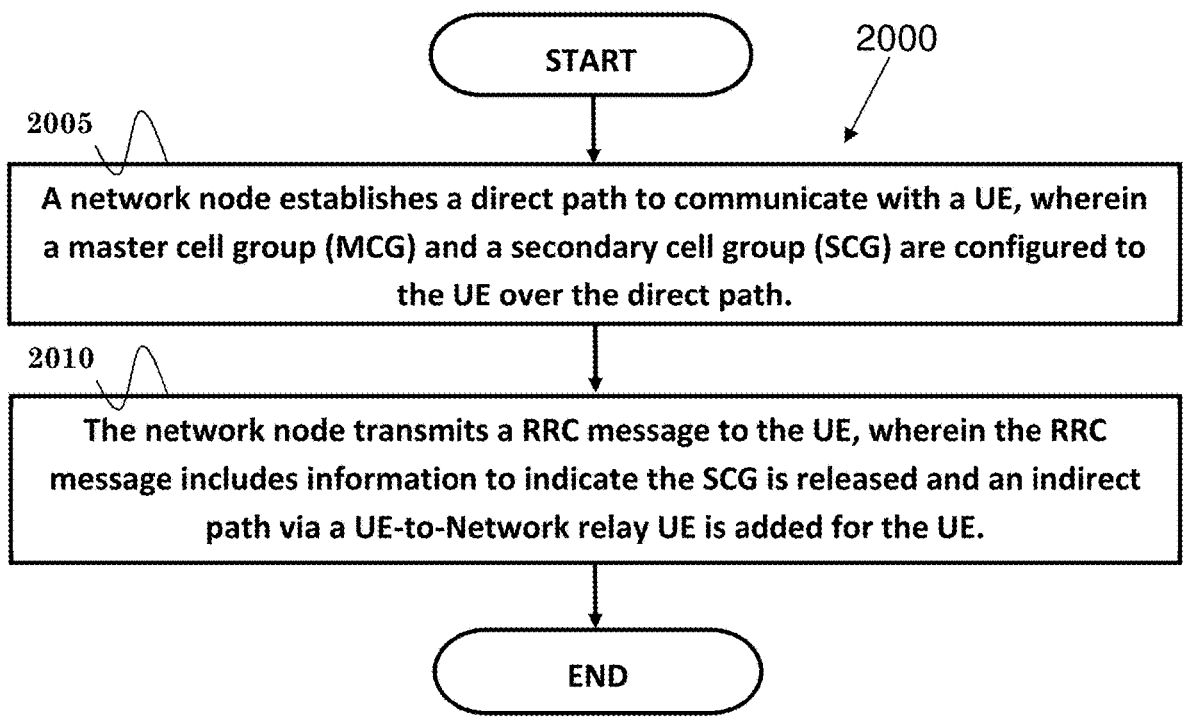
FIG. 20 is a flow chart according to one exemplary embodiment.

FIG. 20 is a flow chart 2000 of a method for supporting multi-path transmission. In step 2005, a network node establishes a direct path to communicate with a UE, wherein a master cell group (MCG) and a secondary cell group (SCG) are configured to the UE over the direct path. In step 2010, the network node transmits a RRC message to the UE, wherein the RRC message includes information to indicate the SCG is released and an indirect path via a UE-to-Network relay UE is added for the UE.

Figure 21:
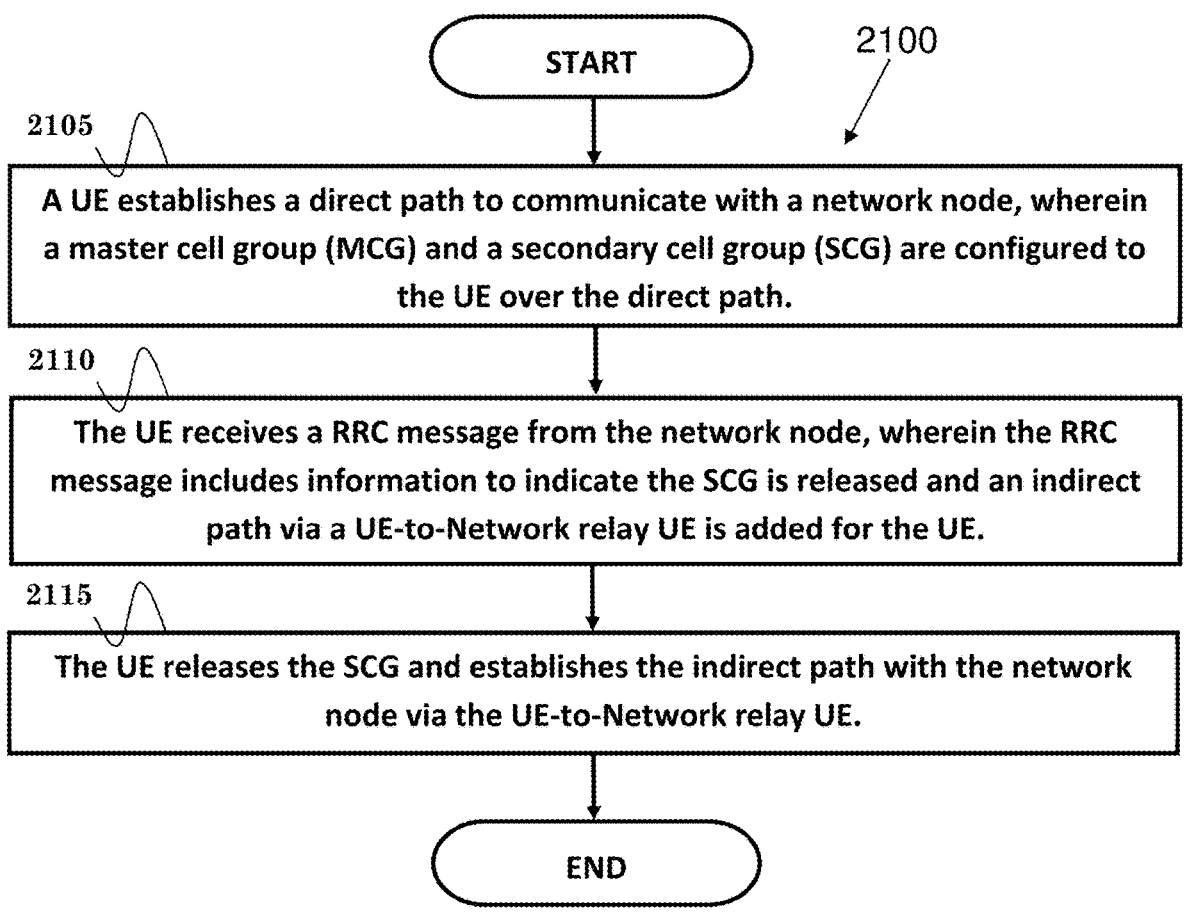
FIG. 21 is a flow chart according to one exemplary embodiment.

FIG. 21 is a flow chart 2100 of a method for supporting multi-path transmission. In step 2105, a UE establishes a direct path to communicate with a network node, wherein a master cell group (MCG) and a secondary cell group (SCG) are configured to the UE over the direct path. In step 2110, the UE receives a RRC message from the network node, wherein the RRC message includes information to indicate the SCG is released and an indirect path via a UE-to-Network relay UE is added for the UE. In step 2115, the UE releases the SCG and establishes the indirect path with the network node via the UE-to-Network relay UE.

In one embodiment, at least one first logical channel belonging to the MCG and at least one second logical channel belonging to the SCG are configured to a data radio bearer (DRB) for communicating with the UE over the direct path.

In one embodiment, the RRC message includes information to configure at least one PC5 Relay RLC channel, mapped to the DRB, to the UE. The at least one PC5 Relay RLC channel is established for communicating with the UE over the indirect path. The RRC message does not include information to indicate the MCG is released.

In one embodiment, the UE-to-Network relay UE is a Layer-2 UE-to-Network relay UE.

In one embodiment, a PC5 RRC connection or a PC5 unicast link is established between the UE and the Layer-2 UE-to-Network relay UE.

Referring back to FIGS. 3 and 4, in one exemplary embodiment of a method for a network node, the network node 300 includes a program code 312 stored in the memory 310. The CPU 308 could execute program code 312 to enable the network node (i) to establish a direct path to communicate with a UE, wherein a master cell group (MCG) and a secondary cell group (SCG) are configured to the UE over the direct path, (ii) to transmit a RRC message to the UE, wherein the RRC message includes information to indicate the SCG is released and an indirect path via a UE-to-Network relay UE is added for the UE. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for duplicate Protocol Data Unit (PDU) discarding, comprising: a User Equipment (UE) establishes a direct path and an indirect path to communicate with a network; the UE establishes a radio bearer, wherein the radio bearer is mapped to a first Radio Link Control (RLC) entity and a second RLC entity and wherein the first RLC entity is used for communication with the network over the direct path and the second RLC entity is used for communication with the network over the indirect path; and a Packet Data Convergence Protocol (PDCP) entity, which is in the UE and which is associated with the radio bearer, prevents from indicating to the first RLC entity to discard a first PDCP PDU in response to successful delivery of the first PDCP PDU is confirmed by the second RLC entity, and the PDCP entity indicates to the second RLC entity to discard a second PDCP PDU in response to successful delivery of the second PDCP PDU is confirmed by the first RLC entity.

2. The method of claim 1, wherein a Sidelink Relay Adaptation Protocol (SRAP) entity between the PDCP entity and the second RLC entity indicates to the second RLC entity to discard the second PDCP PDU due to a request from the PDCP entity.

3. The method of claim 2, wherein the first PDCP PDU and the second PDCP PDU are PDCP Data PDUs.

4. The method of claim 1, wherein the direct path is established via a base station.

5. The method of claim 1, wherein the indirect path is established via a Layer-2 UE-to-Network relay UE.

6. The method of claim 1, wherein the radio bearer is a split bearer.

7. The method of claim 1, wherein the PDCP entity is established by the UE for the radio bearer.

8. The method of claim 1, wherein the first RLC entity and the second RLC entity are Acknowledged Mode (AM) RLC entities.

9. The method of claim 1, wherein the first RLC entity is a Uu RLC entity and the second RLC entity is a PC5 RLC entity.

10. A User Equipment (UE), comprising: a processor and a memory operatively coupled to the processor, wherein the processor is configured to execute a program code stored in the memory to: establish a direct path and an indirect path to communicate with a network; establish a radio bearer, wherein the radio bearer is mapped to a first Radio Link Control (RLC) entity and a second RLC entity and wherein the first RLC entity is used for communication with the network over the direct path and the second RLC entity is used for communication with the network over the indirect path; and prevent from indicating, by a Packet Data Convergence Protocol (PDCP) entity which is in the UE and which is associated with the radio bearer, to the first RLC entity to discard a first PDCP PDU in response to successful delivery of the first PDCP PDU is confirmed by the second RLC entity, and indicate, by the PDCP entity, to the second RLC entity to discard a second PDCP PDU in response to successful delivery of the second PDCP PDU is confirmed by the first RLC entity.

11. The UE of claim 10, wherein a Sidelink Relay Adaptation Protocol (SRAP) entity between the PDCP entity and the second RLC entity indicates to the second RLC entity to discard the second PDCP PDU due to a request from the PDCP entity.

12. The UE of claim 10, wherein the direct path is established via a base station.

13. The UE of claim 10, wherein the indirect path is established via a Layer-2 UE-to-Network relay UE.

14. The UE of claim 10, wherein the radio bearer is a split bearer.

15. The UE of claim 10, wherein the PDCP entity is established by the UE for the radio bearer.

16. The UE of claim 10, wherein the first PDCP PDU and the second PDCP PDU are PDCP Data PDUs.

17. The UE of claim 10, wherein the first RLC entity and the second RLC entity are Acknowledged Mode (AM) RLC entities.

18. The UE of claim 10, wherein the first RLC entity is a Uu RLC entity and the second RLC entity is a PC5 RLC entity.

* * * * *